(12) United States Patent
Williams

(10) Patent No.: US 7,113,505 B2
(45) Date of Patent: Sep. 26, 2006

(54) MESH ARCHITECTURE FOR SYNCHRONOUS CROSS-CONNECTS

(75) Inventor: Joseph Williams, Holmdel, NJ (US)

(73) Assignee: Agere Systems Inc., Allentown, PA (US)

( * ) Notice: Subject to any disclaimer, the term of this patent is extended or adjusted under 35 U.S.C. 154(b) by 937 days.

(21) Appl. No.: 10/023,127

(22) Filed: Dec. 17, 2001

(65) Prior Publication Data
US 2003/0112831 A1   Jun. 19, 2003

(51) Int. Cl.
H04Q 11/00 (2006.01)
H04L 12/56 (2006.01)

(52) U.S. Cl. .................. 370/370; 370/427; 370/429

(58) Field of Classification Search ........... 370/427, 370/238.1, 294, 395.32, 395.72, 406, 374–375, 370/372, 369, 370, 371
See application file for complete search history.

(56) References Cited

U.S. PATENT DOCUMENTS

| | | | | |
|---|---|---|---|---|
| 4,782,478 A | * | 11/1988 | Day, Jr. et al. | 370/356 |
| 5,159,595 A | * | 10/1992 | Flanagan et al. | 370/224 |
| 5,323,390 A | * | 6/1994 | Pawelski | 370/371 |
| 5,329,524 A | * | 7/1994 | Paker et al. | 370/370 |
| 5,430,716 A | * | 7/1995 | Pawelski | 370/388 |
| 5,457,556 A | * | 10/1995 | Shiragaki | 398/50 |
| 6,108,333 A | * | 8/2000 | Raamot et al. | 370/370 |
| 6,240,063 B1 | * | 5/2001 | Suzuki | 370/217 |
| 6,584,119 B1 | * | 6/2003 | Taniquchi et al. | 370/468 |
| 6,587,470 B1 | * | 7/2003 | Elliot et al. | 370/404 |
| 6,850,660 B1 | * | 2/2005 | Notani | 385/16 |
| 6,870,838 B1 | * | 3/2005 | Dally | 370/369 |
| 6,934,471 B1 | * | 8/2005 | Carvey et al. | 398/45 |
| 2001/0033569 A1 | * | 10/2001 | Dally | 370/369 |
| 2003/0021267 A1 | * | 1/2003 | Wu et al. | 370/388 |

OTHER PUBLICATIONS

"A systolic architecture for sorting an arbitrary number of elements" Zheng, S.Q.; Olariu, S.; Pinotti, M.C.; Algorithms and Architectures for Parallel Processing, 1997. ICAPP 97. 1997 3rd International Conference on Dec. 10-12, 1997 pp. 113-126.*
C. Clos, "A Study of Non-Blocking Switching Networks," Bell Labs Technical Journal, pp. 406-424 (1952).

(Continued)

Primary Examiner—Hassan Kizou
Assistant Examiner—Brian Roberts

(57) ABSTRACT

A synchronous cross-connect switch for routing data samples from a source node to a destination node comprises a mesh architecture including a plurality of inputs for receiving one or more of the data samples presented to the cross-connect switch. The mesh architecture includes a plurality of nodes operatively interconnected with one another using one or more half-duplex links. Each of the nodes further includes a receiver and a transmitter. Each node further includes an input time-slot-interchanger (TSI) operatively coupled to a first half-duplex link and to the receiver, the input TSI being configurable to selectively reorder one or more data samples received by the receiver, and an output TSI operatively coupled to a second half-duplex link and to the transmitter, the output TSI being configurable to selectively reorder one or more data samples to be transmitted by the transmitter. A controller operatively coupled to the receiver and to the transmitter is configured to selectively route a data sample to at least one of an output of the cross-connect switch and an adjacent node in the mesh architecture in a conflict-free manner.

23 Claims, 11 Drawing Sheets

OTHER PUBLICATIONS

S. Kumar et al., "An Algorithm for Control of a Three Stage Clos-Type Interconnection Network," Fourth IEEE Region 10 International Conference, pp. 794-797 (1989).

C. Scheideler et al., "From Static to Dynamic Routing: Efficient Transformations of Store-and-Forward Protocols," *SIAM Journal on Computing*, vol. 30, No. 4, pp. 1126-1155 (1999).

R. Cypher et al., "Universal Algorithms for Store-and-Forward and Wormhole Routing," *In Proc. of the 28th ACM Symp. on Theory of Computing (STOC)*, pp. 356-365 (1996).

J. Hopcroft et al., "An $n^{5/2}$ Algorithm for Maximum Matchings in Bipartite Graphs," *SIAM Journal of Computing*, vol. 2, No. 4, pp. 225-231 (Dec. 1973).

H.N. Gabow et al., "Algorithms for Edge Coloring Bipartite Graphs and Multigraphs," *SIAM Journal of Computing*, vol. 11, No. 1 (Feb. 1982).

A. Schrijver, "Bipartite Edge Coloring in O($\Delta$m) Time," *SIAM Journal of Computing*, vol. 28, No. 3, pp. 841-846 (Dec. 1973).

J. Carpinelli et al., "Applications of Edge-Coloring Algorithms to Routing on Parallel Computers," *Proceedings of the Third International Conference on Supercomputing*, Boston, MA, pp. 249-257 (May 1988).

\* cited by examiner $N = 16$, $n = 4$, $k = 4$

MAXIMAL MATCHING $M_1$ = ( (1,4) (2,1) (3,3) (4,2) )

MAXIMAL MATCHING $M_2$ = ( (1,1) (2,3) (3,2) (4,4) )

$y(i,j)$ = SAMPLE DESTINED TO ROW $i$ COLUMN $j$

COLUMN BIPARTITE GRAPH    A MATCHING FOR ROW a y(i,j) = SAMPLE DESTINED TO ROW i COLUMN j $y(i,j)$ = SAMPLE DESTINED TO ROW $i$ COLUMN $j$ $y(i,j)$ = SAMPLE DESTINED TO ROW $i$ COLUMN $j$

MESH ARCHITECTURE FOR SYNCHRONOUS CROSS-CONNECTS

FIELD OF THE INVENTION

The present invention relates generally to communication networks, and more specifically relates to a synchronous cross-connect including a mesh architecture for routing data through the cross-connect.

BACKGROUND OF THE INVENTION

Communication networks are generally based on either a packet-switching protocol, a circuit-switching protocol, or some combination of the two, such as, for example, an asynchronous transfer mode (ATM) protocol. In a packet-switching protocol, messages are divided into packets before they are sent. Each packet is then individually transmitted and can even follow different routes to its destination based on routing information contained in the packet. Once all the packets forming a given message arrive at the target destination, they are recompiled into the original message. In a circuit-switching protocol, on the other hand, the message path is determined prior to sending the data. A dedicated channel is allocated for transmission between a source and a destination. Because routing is predetermined, transmitted messages need not include routing information, as in the case of packet switching. Circuit switching is ideally suited for applications in which data must be transmitted quickly and must arrive in the same order in which it was sent. For this reason, most real-time data applications, such as, for example, live audio and/or video streaming, employ a circuit-switching protocol.

Time Division Multiplexing (TDM), which is a well-known circuit-switching protocol, allocates multiple data streams to respective time slots and repeatedly transmits a fixed sequence of time slots over a single transmission channel. TDM is predominantly used in telecommunications networks. Synchronous network protocols, such as, for example, Synchronous Optical Network (SONET) and Synchronous Data Hierarchy (SDH) use TDM to transport voice and data through the core of the network. A more detailed description of these and other conventional protocols may be found, for example, in the articles D. Bertsekas et al., "Data networks, Second Edition," Prentice Hall (1992), J. Goralski, "SONET, Second Edition," McGraw-Hill, USA (2000), R. Perlman, "Interconnections: Bridges, Routers, Switches and Internetworking Protocols," Addison-Wesley (1997), M. Sexton, "Broadband Networking: ATM, SCH, and SONET," Artech House, Mass. (1997), S. Kershav, "An Engineering Approach to Computer Networks," Addison-Wesley (1997), A. Tannenbaum, "Computer Networks," Prentice Hall (1996), D. Corner, "Internetworking with TCP/IP," NJ: Prentice Hall (2000), all of which are incorporated herein by reference.

One class of switches known as non-blocking cross-connect switches are typically employed in a synchronous TDM network. A connection between an input and an output of a switch is considered to be blocked if there is no signal path available through the switch. Signal paths must be simultaneously established for all connections in the synchronous TDM network, a condition which is a requirement for admission of a new connection. A non-blocking cross-connect switch must guarantee transmission of data through the switch at a specified aggregate transmission rate. Some conventional approaches to designing non-blocking cross connects include time-division switching, space-division switching, and multistage switching which is essentially a combination of time-division and space-division switching.

Each of the above techniques for routing data through a network, however, incorporate certain undesirable characteristics. Accordingly, there exists a need for a cross-connect architecture for use in a circuit-switching network that overcomes the disadvantages of conventional methodologies.

SUMMARY OF THE INVENTION

The present invention provides techniques for forming architectures for synchronous cross-connects. Techniques according to the invention exploit desirable and useful properties of a distributed mesh topology to provide a solution to conventional crossbar-based architectures. For example, the architectural complexity of the present invention increases only linearly with aggregate bandwidth, as compared to quadratically with a conventional crossbar architecture. Furthermore, the architecture of the invention is easily scalable, for example, by simply tiling primary functional blocks. The cross-connect architecture of the present invention requires only local communication and is therefore very amenable to fabrication on a semiconductor integrated circuit (IC) device. It is also optimal for area-based flip-chip input/output (I/O) packaging. Regularity in the design allows the architecture of the present invention to be scaled with process technology and to be easily extended to multi-chip implementations for forming multi-terabit systems.

In accordance with one aspect of the invention, a synchronous cross-connect switch includes a mesh architecture having a plurality of inputs for receiving one or more data samples presented to the cross-connect switch. The mesh architecture includes a plurality of nodes operatively interconnected with one another using one or more half-duplex links. Each of the nodes in the mesh architecture includes a receiver, a transmitter, and an input time-slot-interchanger (TSI) coupled to a first half-duplex link and to the receiver, the input TSI being configured to selectively reorder one or more samples received by the receiver. Each of the nodes further includes an output TSI coupled to a second half-duplex link and to the transmitter, the output TSI being configured to selectively reorder one or more samples to be transmitted by the transmitter, and a controller operatively coupled to the receiver and transmitter. The controller is configured to selectively route a sample to at least an output of the cross-connect switch or an adjacent node in the mesh architecture.

In accordance with another aspect of the invention, a method of routing one or more samples through a cross-connect switch, the cross-connect switch including a plurality of nodes operatively coupled in a mesh arrangement, each of the nodes including one or more time-slots associated therewith, includes the steps of: precomputing one or more routing sequences, the routing sequences reducing a routing in the mesh to a one-to-one routing within each of the time-slots; reordering the samples within one or more source nodes in accordance with the precomputed routing sequences; routing the samples from the one or more source nodes to one or more corresponding destination nodes through the mesh; and reordering the samples within the destination nodes, whereby the samples are transmitted during a correct time-slot.

These and other features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
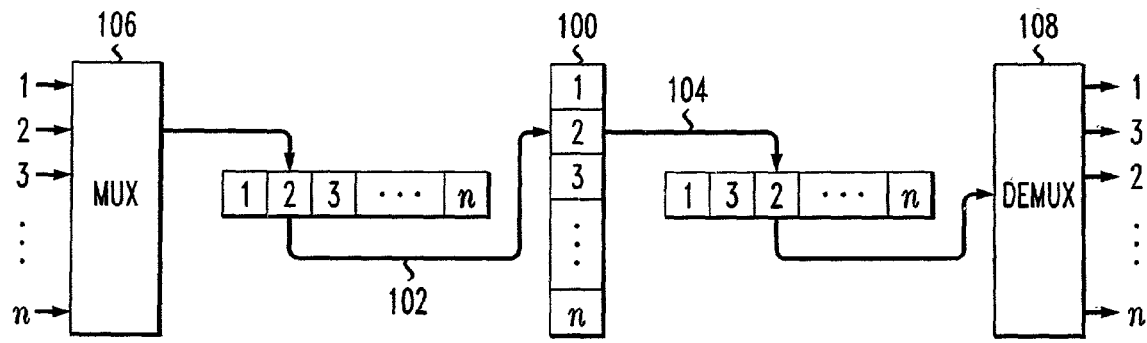
FIG. 1 is a graphical representation illustrating a time-division multiplexing architecture.

FIG. 1 illustrates a time-division switching or multiplexing scheme which includes a time-slot interchanger (TSI) 100. The TSI 100 is typically implemented as a buffer having a single input line 102 and a single output line 104, but these lines carry samples from n distinct channels that are multiplexed by a multiplexor (MUX) 106. The different order of samples on the output line 104, when passed through a demultiplexer (DEMUX) 108, results in the n samples being placed on corresponding output lines of the DEMUX 108. In essence, the TSI 100 switches samples by rearranging the order of the samples on a multiplexed line.

The process of reordering the samples is repeated every n clock cycles and is referred to as the period of the TSI. In practice, the TSI 100 is often comprised of two buffers, one buffer being used for reading data and another buffer being used for writing data during a given TSI period. At the completion of a TSI period, the TSI buffers switch function (i.e., the buffer used for reading data during a TSI period is used for writing data during the next TSI period, and vice versa). Within a given TSI period, the clock cycle in which a sample arrives is referred to as the input time-slot. The clock cycle in which the sample is read from the TSI buffer is referred to as the output time-slot. The function of the TSI buffer is to transfer samples from an input time-slot to an output time-slot. In addition to the n-byte buffer, a memory with n elements is required to store the mappings from input time-slots to output time-slots for each sample in a TSI period. This is generally referred to as a connection memory or connection map.

The TSI has an advantage of being very simple, both conceptually and architecturally. Configuring the TSI amounts to merely updating connection memory in the TSI. Furthermore, the TSI is able to support multicasting, which is when one input channel gets mapped to more than one output channel. A TSI supports this function by simply mapping an input time-slot to multiple output time-slots. The TSI, however, is not well-suited to building high bandwidth switches. For example, a cross connect with a one Terabit per second (Tbit/s) aggregate bandwidth requires a TSI memory having at least one Tbit/s of memory bandwidth. Using present very large scale integration (VLSI) technology, it is not possible or practical to construct a byte-addressable memory with more than a few Gigabits per second (Gbit/s) of memory bandwidth. An access time of less than one nanosecond (ns) is very difficult to achieve for an appropriately sized memory. The memory bandwidth can be increased by employing multiport memory and allowing multiple simultaneous memory accesses. However, each additional memory port comes at the expense of additional integrated circuit (IC) chip area and cost. Even 100 Gbit/s multiport memory would be prohibitively large using current VLSI technology.

Figure 2:
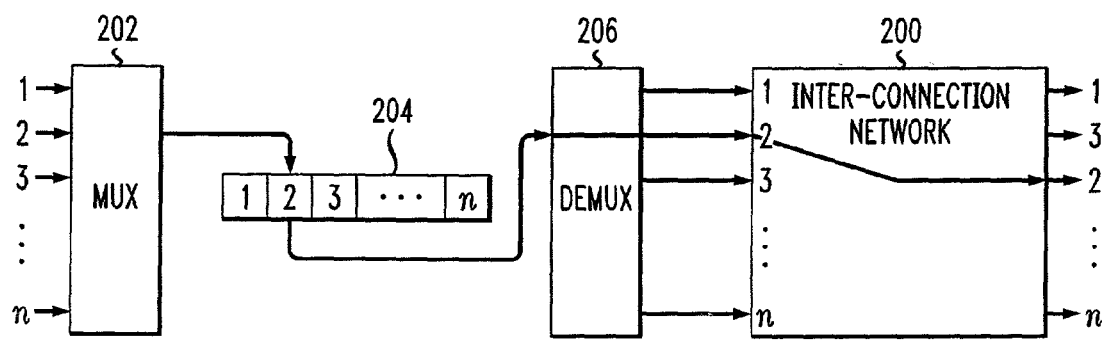
FIG. 2 is a graphical representation illustrating a space-division multiplexing architecture.

FIG. 2 illustrates a space-division switching or multiplexing scheme which includes an interconnection network 200. In space-division multiplexing, a spatially distinct signal path carries samples from a source channel to a destination channel. The samples are multiplexed by a multiplexor (MUX) 202 and stored in a buffer 204 before being sent to a demultiplexer (DEMUX) 206. Each sample is associated with a different signal path through the switching mechanism, depending on its destination. The interconnection network 200 is used to connect all input channels to their destination output channel. Since the primary focus herein is on non-blocking cross-connects, the interconnection network 200 must effectively behave as non-blocking for all connections.

The design and analysis of interconnection networks is a fundamental topic of study in the computer architecture and parallel processing research community. Many of these architectures have been reported which make tradeoffs between functionality, performance, and complexity. Typically, domain-specific knowledge is employed to select the best architecture. In the case of synchronous cross-connects, the tradeoffs that are usually considered are between throughput, latency, and hardware complexity.

Figure 3:
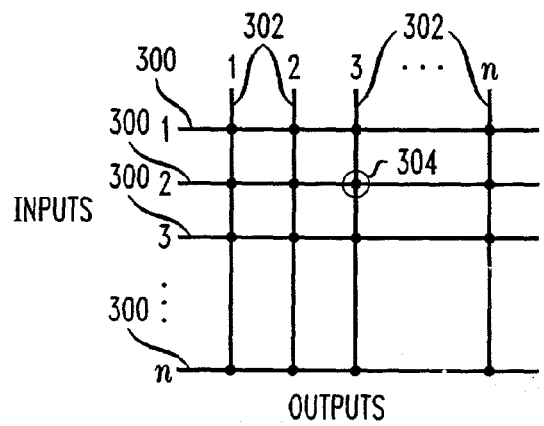
FIG. 3 is a schematic diagram illustrating an n×n crossbar switch.

One well-known interconnection network for use with a space-division switch is a crossbar. An illustrative crossbar arrangement is depicted in FIG. 3. Samples arrive on rows 300 and are output on columns 302. Active elements, generally referred to as cross-points, are placed at each intersection between input and output lines. When a particular cross-point is active 304, a signal path is formed from an input line (e.g., input 2) to a corresponding output line (e.g., output 3). If the input lines are not multiplexed, a crossbar always connects the same inputs to the same outputs. However, if the input lines carry multiplexed samples, as is often the case, and the samples have different destinations, a crossbar requires a schedule that determines which cross-points in the crossbar to activate during a given sample period. Based upon this schedule, samples are transferred from the selected input to the selected output.

A crossbar is internally non-blocking (i.e., no sample is blocked in the switch waiting for an output line). However, a crossbar may be externally blocking. If two samples are assigned to the same output at the same time, then there is a collision and one of the samples cannot be transmitted at that time. Therefore, it is required that the crossbar be scheduled so that there are no collisions. Implementation of this crossbar schedule may be quite complex, requires added overhead circuitry and IC area, and may increase latency, all of which are undesirable characteristics of the conventional space-division switching technique.

Figure 4:
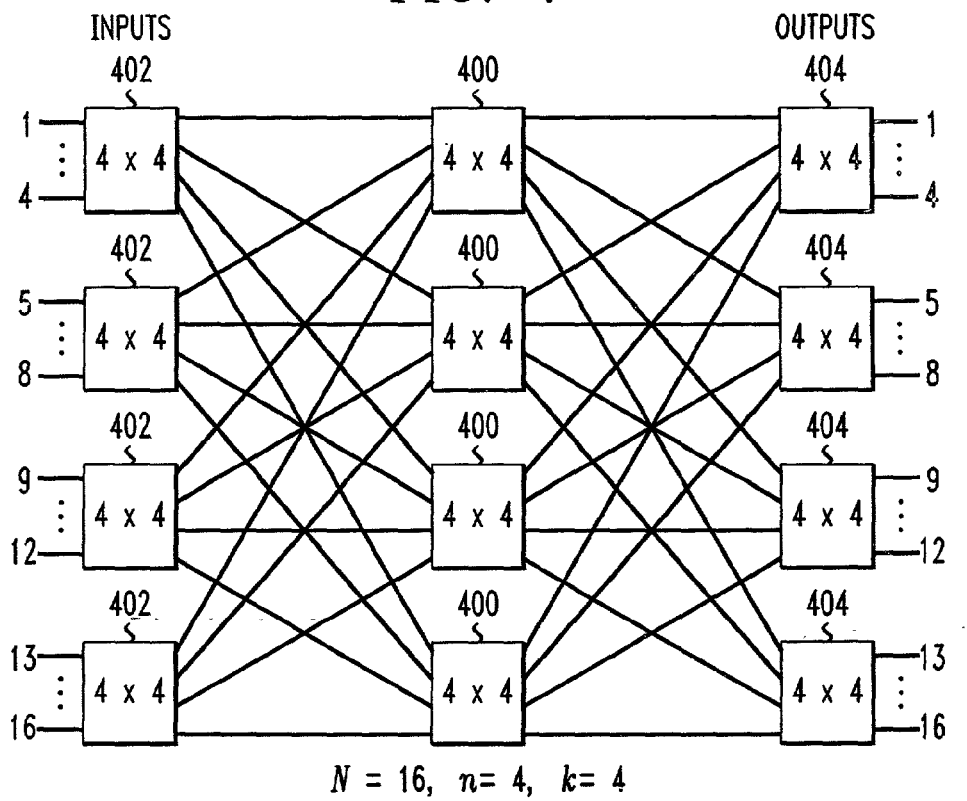
FIG. 4 is a graphical representation illustrating a 16-input multistage crossbar switch.

An m×m crossbar uses $m^2$ cross-point elements and is therefore costly to implement, particularly for large values of m, where m is the number of channels in the crossbar. Since only m of the $m^2$ cross-points are active at any given time, there is a large degree of redundancy. This inefficiency has been addressed through the use of multistage switches, an example of which is depicted in FIG. 4. In a multistage switching scheme, the inputs of the multistage switch are generally divided into arrays which are internally switched by a crossbar. Multiple signal paths between input arrays 402 and output arrays 404 share center stage arrays 400, thus reducing the overall number of cross-points. During each time-slot, each array in the multistage switch must be rearranged. In a typical multistage switch, the first or input stage contains N/n arrays of size n×k, the second or center stage contains k arrays of size N/n×N/n, and the third or output stage contains N/n arrays of size k×n, where N is the number of channels in the crossbar, n is the number of inputs in each of the arrays 402, 404 in the first and last stages, respectively, and k is the number of arrays 400 in the second stage. A conventional multistage crossbar with N=16, n=4, and k=4 is shown in FIG. 4.

Clos proved that if k≧n, a schedule can be found which makes the multistage crossbar non-blocking. The multistage crossbar is therefore commonly referred to as a Clos network or Clos architecture. A more detailed description of Clos networks may be found, for example, in the articles C. Clos, "A Study of Non-Blocking Switching Networks," Bell Labs Technical Journal, pp. 406–424 (1952), and S. Kumar et al., "An Algorithm for Control of a Three Stage Clos-Type Interconnection Network," Fourth IEEE Region 10 International Conference, pp. 794–797 (1989), which are incorporated herein by reference.

Crossbar-based cross-connects have advantages of low latency, high throughout and some degree of scalability. However, crossbar-based cross-connects may be externally blocking, since samples from two or more input channels maybe undesirably connected to the same output channel. The only way to avoid this is to have the crossbar run n times faster, which is impractical.

Conventionally, in order to avoid external blocking, time-division switching has been combined with space-division switching. As stated above, a TSI can be viewed as rearranging samples on the input and output lines of a spatial switch. In time-space-time (TST) switching, the outputs of many TSIs are fed into a space-division switch. If the time or T-stage were missing, then at a given time, there might be many inputs of the space or S-stage destined for the same output, which would cause blocking. By rearranging the order in which the S-stage receives samples, a degree of freedom can be gained in selecting the S-stage schedule. At the output of the S-stage, another set of TSIs at the output lines rearrange the samples to deliver them to the output channels at the correct time-slot.

Figure 5:
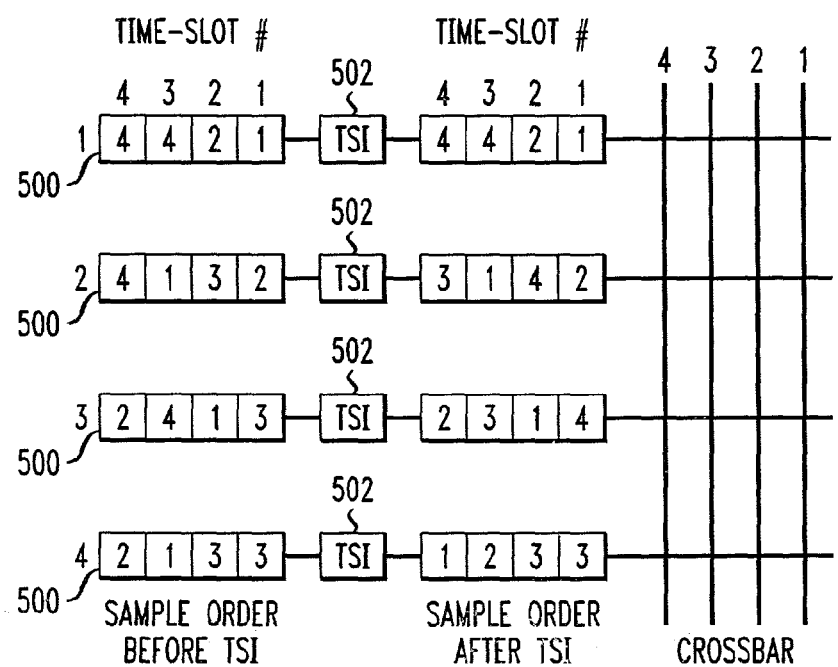
FIG. 5 is a graphical representation illustrating a time-space-time (TST) switch implemented using a crossbar.

The use of time-division switching to avoid collisions in a space-division switching architecture is illustrated in FIG. 5. With reference to the example of FIG. 5, there are four channels 500, each channel 500 having four time-slots. Consider the samples that arrive during time-slot 1. Note, that two samples which arrive during this time-slot are destined for channel 3. If these two samples were directly input to a crossbar switch, a collision would result at the output. By using the TSIs 502 to reorder the samples within each channel 500, it is possible to avoid collisions by having the samples directed to channel 3 permuted to different time-slots.

TST switching using multistage crossbars as the S-stage is the most common architecture for conventional high-end cross-connects. However, there are several disadvantages with this conventional architecture. Although the multistage switching architecture is scalable, its scalability is severely limited. First, as the number of channels n increases, the required hardware increases proportionally with $n^2$. Second, the crossbar arrangement is not well-suited for convenient implementation in a VLSI integrated circuit. Typically, a crossbar IC layout requires many intersecting connections that span the entire area of the crossbar. This leads to wiring congestion, resistance-capacitance (RC) delays due to long interconnects, and associated design challenges required to make the design routable and close in timing. In addition, there are various electrical problems inherent in such architecture, such as, but not limited to, signal crosstalk, charge collecting antenna, and other electrical impairments that undesirably effect mixed signal circuits. Third, the conventional architecture, when scaled, lacks the flexibility to meet many design criteria without significant redesign, due to the precise number of stages, the number of components per stage, and the number of inputs per stage component.

The present invention, as will be described herein in conjunction with an illustrative Synchronous Optical Network (SONET), realizes at least some of the drawbacks associated with the approaches described above. It should be appreciated, however, that the techniques of the present invention are not limited to this or any type of synchronous network. Rather, the invention is more generally applicable to any circuit-switching network, such as, for example, a time-division multiplexing (TDM) network.

A TDM circuit-switching network transports data samples, the smallest unit of data that is carried through the network. In a voice communications environment, for example, a sample is commonly 8-bits long and corresponds to 125 microseconds (μs) of sampled voice information derived from a single 64K bits per second (bps) voice channel. For simplicity, the term "sample" is often used interchangeably with the term "byte" since a byte is the most common sample size in the TDM network. It is to be appreciated, however, that a sample can convey any type of data, not merely voice data, and that the sample size is not limited to a particular number of bits. Unlike in a conventional packet-switching protocol, the sample in the circuit-switching protocol of the present invention is not required to include a header portion describing its source or destination. Rather, the destination of a particular sample is inferred from the physical channel on which it is carried and the particular time at which the sample is placed on the channel (e.g., the position of the sample in a frame).

The term "channel" as used herein is intended to include any transmission-type media, such as, but not limited to, digital and analog communication links, wired or wireless communication links using transmission forms, such as, for example, radio frequency and optical transmissions, etc., or metal traces on a printed circuit board (PCB). A channel has a certain data rate associated therewith which determines how many samples per second can be transmitted on that particular media. Lower rate channels can be aggregated into a single higher rate channel by using, for example, multiplexors, as understood by those skilled in the art. Likewise, lower rate channels can be extracted from a higher rate channel by using, for example, demultiplexers.

A circuit-switching network such as SONET includes network element nodes interconnected with optical links to selectively construct different topologies, such as, for instance, rings. The function of the network element nodes is to multiplex lower rate channels into higher rates channels, demultiplex higher rate channels into lower rate channels, and to switch data between different channels. TDM channels can be selectively added and dropped in the network hierarchy through the use of one or more Add/Drop Multiplexors (ADM). Connections between channels are preferably switched with cross-connect switches or cross-connects. In addition to switching data between channels, cross-connects provide network protection by rapidly establishing new connections between channels when a signal path or link fails. An important challenge in the design of a cross-connect network is that it must have a bandwidth large enough to switch all data that is aggregated at the network core, which is presently in the terabit range.

In accordance with one aspect of the invention, TDM signals are preferably routed using a time-space-time (TST) switching architecture. The general TST switching architecture was previously described in connection with a multistage crossbar arrangement, as shown in FIG. 5. However, instead of using a multistage crossbar as a space-stage or S-stage switch, as is conventionally done, the present invention uniquely exploits the properties of a mesh topology which is employed as an interconnection network for synchronous cross-connects.

Figure 6:
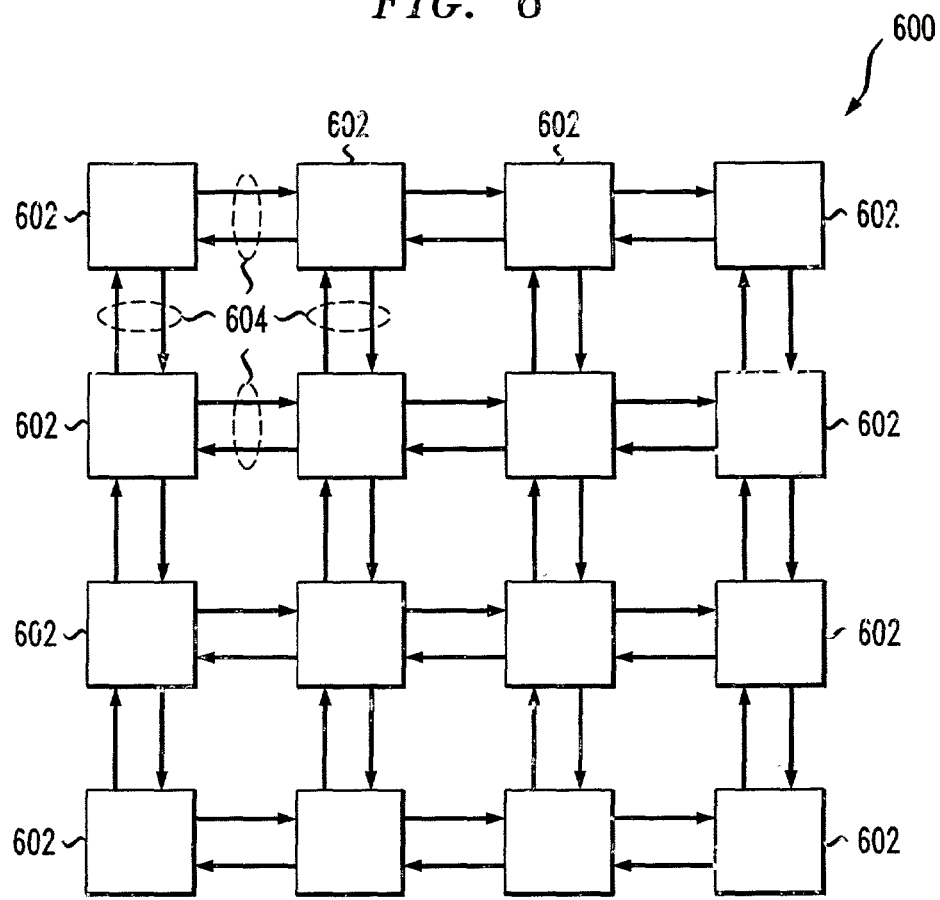
FIG. 6 is a block diagram depicting an exemplary 16-channel cross-connect implemented using a 4×4 mesh, in accordance with one aspect of the present invention.

By way of example only, FIG. 6 illustrates an architecture utilizing a 4×4 mesh 600 to implement a 16-channel cross-connect switch, in accordance with the present invention. As apparent from the figure, the mesh 600 can be viewed as a two-dimensional (2D) array of nodes 602 operatively interconnected with adjacent nodes 602 in the array using a plurality of half-duplex links 604. The nodes 602 can be referenced according to their column and row positions in the mesh 600. Each node 602 preferably includes at least one channel that receives and transmits data samples to and from the cross-connect. Each sample that arrives on a given receive channel associated with a node is subsequently forwarded to a particular transmit channel in the node. The channel that a sample is received on may be considered the source channel and the channel that the sample is transmitted from may be considered the destination channel. The sample is preferably selectively routed through the mesh 600 by being transferred from a source channel to a destination channel of a predetermined node(s). When the transmit channel receives a sample, the sample must be transmitted with the correct timing so that it is properly synchronized with other samples that are transmitted during the same time interval from other channels in the mesh architecture. Preferably, buffering is employed to insure correct timing.

Figure 7:
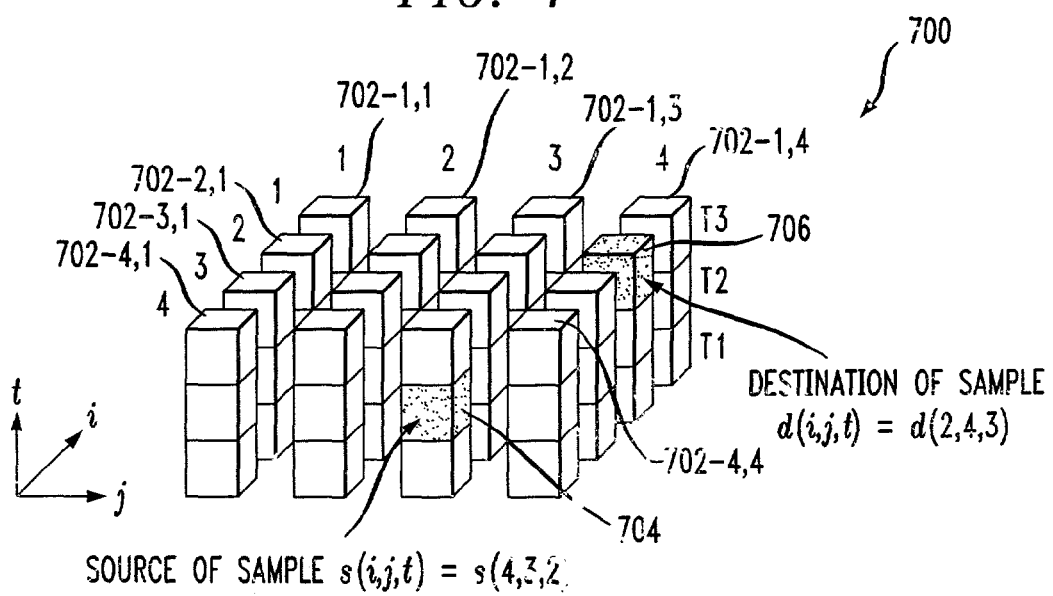
FIG. 7 is a graphical representation depicting a three-dimensional model of the 4×4 mesh shown in FIG. 6, in accordance with the present invention.

One way to visualize the mesh architecture of the present invention is to employ a three-dimensional (3D) model with time being represented in the third (t-axis) dimension, as illustrated in FIG. 7. With reference to FIG. 7, there is shown an exemplary 16-channel cross-connect architecture implemented using a 4×4 mesh 700, with each node 702-1,1 through 702-4,4 including three time-slots T1, T2, T3. It is to be appreciated that although a 4×4 mesh is shown primarily for ease of explanation, the techniques of the present invention described herein maybe extended to any i×j mesh, with each node in the mesh including t time-slots, where i, j and t can be any integer greater than zero. The coordinates (i,j) may be used to specify a particular node address, while the coordinate t may be used to specify a particular time-slot in a given node. Using these coordinate designations, each sample in the mesh 700 can be referenced according to its unique coordinate (i, j, t), such that a sample is routed from a source node and time-slot s(i, j, t) to a destination node and time-slot d(i, j, t). For instance, FIG. 7 illustrates a sample 704 in source node (4, 3) time-slot T2 designated as s(4, 3, 2). Likewise, a sample 706 in destination node (2, 4) time-slot T3 is designated as d(2, 4, 3).

As understood by those skilled in the art, routing of a source node s(i,j) to a destination node d(i, j) can be performed using a conventional store-and-forward routing technique. Store-and-forward routing techniques which are suitable for use with the present invention are described, for example, in the articles C. Scheideler and B. Vöcking, "From Static to Dynamic Routing: Efficient Transformations of Store-and-Forward Protocols," *SIAM Journal on Computing*, Vol. 30, No. 4, pp. 1126–1155 (1999) and R. Cypher, F. Meyer auf def Heide, C. Scheideler and B. Vöcking, "Universal Algorithms for Store-and-Forward and Wormhole Routing," *In Proc. of the 28th ACM Symp. on Theory of Computing (STOC)*, pp. 356–365 (1996), which are incorporated herein by reference. Accordingly, a detailed explanation of store-and-forward routing techniques will not be presented herein. The address of the destination node is preferably appended to each sample and is examined by each node to determine whether to keep the sample or to forward it towards its ultimate destination node.

A routing technique may be employed which provides deterministic latency for channel routing and constant size memory requirements. Deterministic worst-case latency can be insured by performing graph-theoretic precomputations off-line. Preferably, a systolic sorting technique is used for the store-and-forward routing to insure that the constant memory size requirement is met, as will be understood by those skilled in the art. In accordance with the present invention, each node 702-1,1 through 702-4,4 in the mesh 700 is the source and/or destination of at most four samples every clock cycle. Data traverses along the i-axis and j-axis through the array of nodes in the 2D mesh. Store-and-forward routing can be performed in a contention-free or conflict-free manner, as will be explained below. The control necessary to perform such routing is preferably completely distributed, although other routing control arrangements suitable for use with the invention may be similarly employed.

Figure 8:
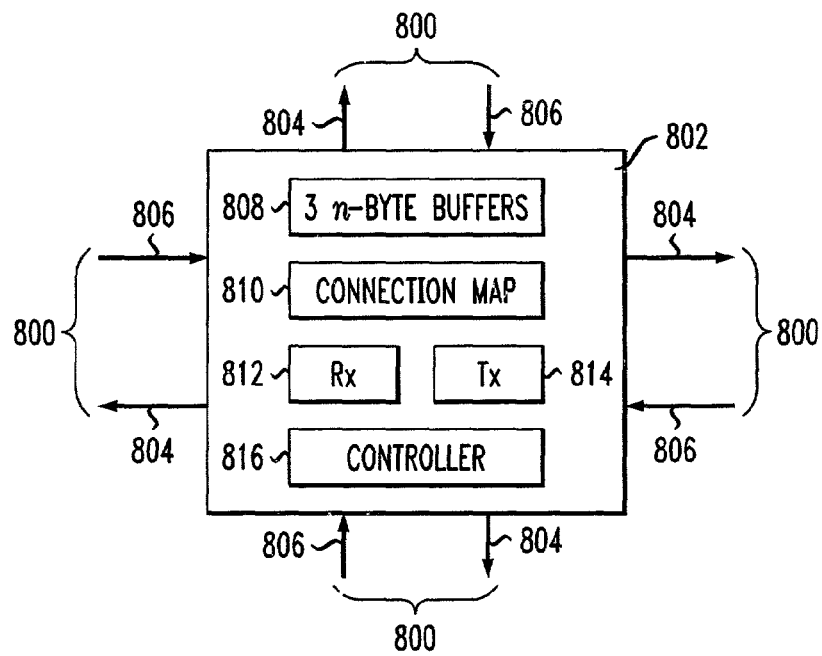
FIG. 8 is a block diagram depicting an exemplary node, in accordance with one aspect of the present invention.

FIG. 8 illustrates a functional block diagram of an exemplary node 802, formed in accordance with the present invention. Node 802 is consistent with any one of the nodes 602 in the illustrative mesh of FIG. 6, for example. As apparent from FIG. 8, node 802 preferably comprises a number of functional sub-circuits or blocks, including a receiver (Rx) 812, a transmitter (Tx) 814, a buffer block 808 which actually comprises three n-byte buffers functioning as an input time-slot-interchanger (TSI), an output TSI and a routing buffer, a connection memory or map 810, and a controller 816. In order to transfer data samples between adjacent nodes in the mesh, node 802 includes a plurality of pairs of half-duplex links 800. For the exemplary node 802, four pairs of half-duplex links 800 are shown. Consistent with the half-duplex links 604 shown in FIG. 6, each pair of half-duplex links 800 preferably includes an outgoing link 804 for transmitting data from node 802 to one or more adjacent nodes, and an incoming link 806 for receiving data from one or more adjacent nodes. Although depicted as separate functional blocks, it is to be appreciated that one or more blocks included in node 802 may be combined with or incorporated into one or more other functional blocks. For example, receiver 812 and transmitter 814 may be implemented as a single transceiver which incorporates both the receiver and transmitter functions.

The receiver 812 and transmitter 814 are preferably operatively coupled to one or more line cards, which are often external to the cross-connect, such as via a backplane or alternative connection arrangement. The line cards transmit data to and/or receive data from, for example, fiber optic links in the SONET. The receiver 812 and transmitter 814 may be implemented using, for example, a serializer/deserializer (SERDES). The SERDES transmits a serial data stream chip-to-chip at high speeds (e.g., 2.5 GHz) and uses multiplexing and demultiplexing for transferring a parallel data stream on-chip at a slower speed (e.g., 312 MHz), which is generally some multiple (e.g., ⅛) of the serial data stream. The receiver 812 preferably includes an input/output (I/O) interface for receiving external data (e.g., from off-chip), aligns the data to recover samples, and forwards the data to the input TSI in buffer block 808. Likewise, the transmitter 814 preferably includes an I/O interface for receiving samples from the output TSI in block 808, frames the data for transmission, and sends the data off-chip.

With continued reference to FIG. 8, the three n-byte buffers comprising buffer block 808 may be implemented, for example, using random access memory (RAM) of a predetermined size. Each of the three buffers preferably includes enough memory to store the n samples that are switched per period. For example, if there are 48 samples switched per period, then each of the three buffers in block 808 requires 48 bytes of storage. The connection map 810 also preferably includes 48 entries, each entry corresponding to a sample and including enough bits to specify the destination node and time-slot. As previously stated, each node 802 may include four pairs of half-duplex links 800. Each link 800 can be configured to transmit or receive all the data in buffer block 808 simultaneously. Accordingly, for the example case where there are 48 samples per period, each link 800 can send or receive 48 bytes of data. The four links 800 allow multiple nodes to be operatively interconnected to form a 2D mesh, as shown in FIG. 6.

Buffer block 808 preferably operates in conjunction with the receiver 812 and transmitter 814. Specifically, data arriving from off-chip that needs to be switched is received from the receiver 812, where clock and data is recovered by the SERDES and is demultiplexed to form a sample (e.g., a byte or 8-bits). The sample is then stored in one of the three n-byte buffers in block 808. Depending upon the destination node, as obtained from the connection map 810, the sample is transferred over one of the four outgoing half-duplex links 804. Conversely, samples received from adjacent nodes arrive on one of the four incoming half-duplex links 806 and is stored in one of the three n-byte buffers in block 808. A received sample that has not yet reached its destination node will be stored in block 808 for one clock cycle and then transmitted to an adjacent node which is closer to its final destination. A byte that has reached its final destination node is transferred from one of the three n-byte buffers in block 808 to the transmitter 814 which multiplexes the sample to a bit serial data stream and transfers the data off-chip.

Controller 816 is operatively coupled to the receiver 812 and transmitter 814 and functions primarily to control all operations of the node, including the routing of data through a corresponding node 802. Since the functionality of the controller 816 is essentially fixed, it can be hardwired (which is generally more efficient than a software programmed microprocessor, at least in terms of speed), for example, as a state machine operatively configured to perform the data routing function in accordance with a predefined set of steps, as will be explained in further detail below. It is to be appreciated, however, that other alternative implementations of the controller 816 are contemplated by the present invention, such as, but not limited to, a microprocessor configured to execute one or more software application programs. Accordingly, an application program, or software components thereof, including instructions or code for performing the methodologies of the invention, as will be further described herein, may be stored in one or more associated storage media (e.g., read-only-memory (ROM), fixed or removable storage, etc.) and, when ready to be utilized, loaded in whole or in part (e.g., into RAM) and executed by the controller 816.

A primary problem of routing samples on a mesh architecture is simplified by exploiting the fact that the source-to-destination mapping is inherently known a priori in a circuit-switching network. Therefore, calculations performed off-line are used to advantageously reduce routing complexity. According to the present invention, calculations used to perform conflict-free store-and-forward routing in a one-dimensional (1D) linear array are first described. Next, additional calculations are presented for reducing a 2D mesh routing problem into a plurality of simple 1D routes that are substantially collision-free.

The connection map 810 in each node 802 is operatively coupled to the controller 816 and preferably stores information regarding where data received by the node 802 is coming from and where the data needs to go. The connection map 810 may be implemented, for example, using RAM or other suitable storage media. Based at least in part on the information stored in the connection map 810, the controller 816 orchestrates the flow of data through the cross-connect.

In accordance with one aspect of the invention, a method for routing samples through the mesh is preferably reduced to the following fundamental operations or steps:

1. Reorder samples within one or more source channels using input TSIs with sequences precomputed off-line. The sequences reduce routing in the 2D mesh to a simpler one-to-one routing problem within each time-slot. Any given time-slot in the channels can then be viewed as an independent routing problem.
2. Route samples from a source channel to a destination channel through the 2D mesh. For n time-slots, n 2D mesh routes occur in parallel.
   a. Perform 1D routing of samples in a first dimension (e.g., column direction) in parallel using the results of off-line precomputations which determine a destination for each of the samples.
   b. Perform 1D routing of the samples in a second dimension (e.g., row direction) in parallel (i.e., substantially concurrently) so that samples are routed to the correct nodes in the first dimension (e.g., correct columns).
   c. Perform 1D routing of the samples in the first dimension (e.g., columns) in parallel (i.e., substantially concurrently) so that each of the samples are routed to a desired destination channel.
3. Reorder the samples within the destination channels using output TSIs so that the samples are transmitted during the correct time-slots.

The above methodology of the present invention is preferably performed during every cross-connect period. A mathematical formulation will be presented for cross-connect routing on a mesh whereby certain useful results derived from combinatorics and graph theory can be advantageously exploited and applied to the present invention. First, it will be shown how these results can be used for routing samples in a 1D mesh, for example, a linear array, which represents a special case of the 2D mesh (i.e., a 1×n mesh). Using an algorithmic analysis of a graph-theoretic model, a 2D mesh routing based on a predetermined number of 1D routings can be devised, in accordance with the present invention. Preferably, the methodology of the invention will formulate the channel routing as a one-to-one routing problem.

Mapping to a One-to-One Routing

Figure 9:
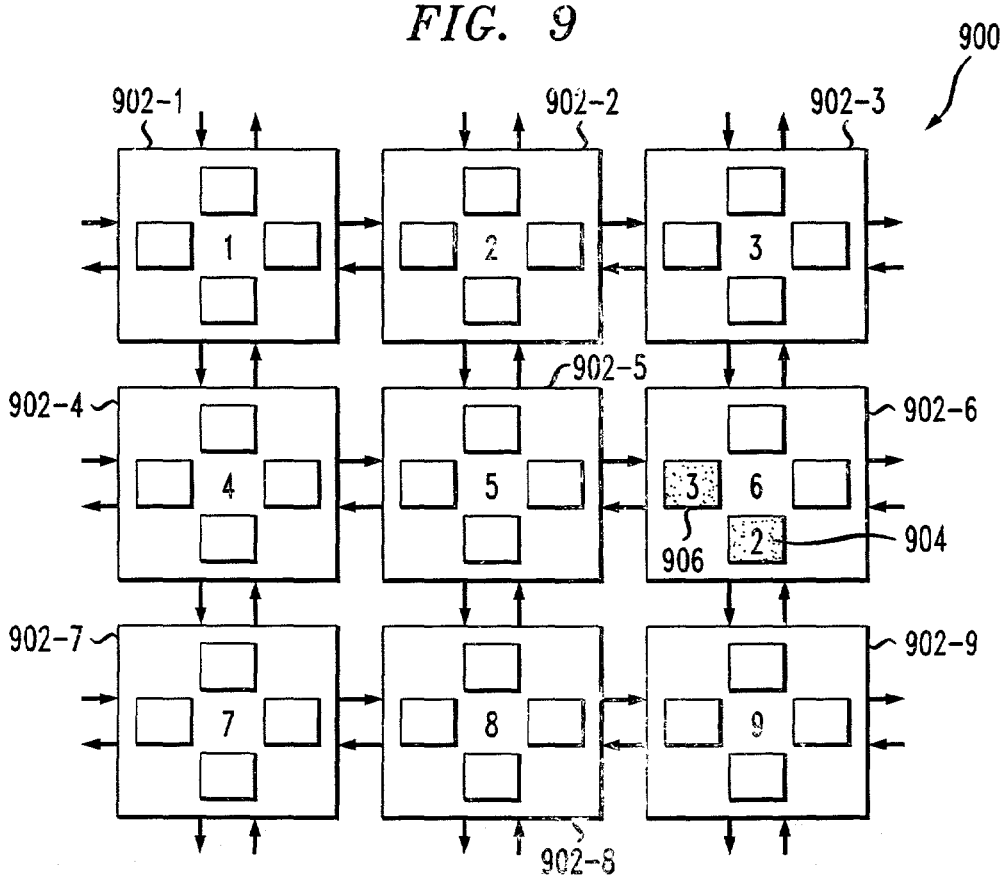
FIG. 9 is a graphical representation illustrating a routing conflict in a mesh.

The general problem of deterministic routing on a mesh can be difficult due, at least in part, to the occurrence of potential routing conflicts. Routing conflicts may occur when two or more samples arrive at a given node and these samples are destined to proceed along the same signal path simultaneously. This situation is illustrated by way of an exemplary 3×3 mesh depicted in FIG. 9. As shown in the figure, consider a sample 904 originating from node 902-9 that is destined for node 902-2. One possible path for sample 904 is via source node 902-9 to node 902-6 to node 902-3 and finally to destination node 902-2. Likewise, consider another sample 906 originating from node 902-4 that is destined for node 902-3. One possible path for sample 906 is via source node 902-4 to node 902-5 to node 902-6 and finally to destination node 902-3. If sample 906 which originates from node 902-4 is sent one cycle earlier than sample 904 originating from node 902-2, there will ultimately be a collision of the two samples 904, 906 which occurs at node 902-6, since both samples are to be sent to node 902-3 simultaneously.

As apparent from the above scenario, a conflict resolution strategy is necessary. This implies that at least one of the samples must either wait (e.g., be stalled) or be redirected along an alternate route. Conventional conflict resolution strategies generally require either additional memory to store samples that are stalled, or require more latency to deliver samples that traverse longer alternate paths, and thus these conventional approaches are often inefficient and costly. Moreover, the conflict resolution issue becomes even more complex when the number of potential conflicts within a node increases (e.g., greater than two). Therefore, a conflict-free routing methodology is preferred.

In accordance with the present invention, an efficient conflict-free routing method is provided which is superior to conflict resolution techniques conventionally employed, as described above. By addressing the potential routing conflicts prior to routing the samples, the present invention advantageously eliminates the need for conventional conflict resolution strategies. It can be demonstrated that a special case of one-to-one (i.e., 1D) routing in a mesh can be performed conflict free, and that 2D or 3D routing can be reduced to one or more one-to-one routings. Consider a 1D cross-connect that includes m channels and assume that each channel preferably transmits and receives one data sample per clock cycle through the cross-connect. Therefore, a total of m bytes are transmitted and received every cycle. Furthermore, assume that there are n time-slots per channel, which corresponds to n clock cycles of data. The n time-slots represent one cross-connect period. Thus, one cross-connect period corresponds to the transfer of m×n bytes of data through the cross-connect.

Figure 10:
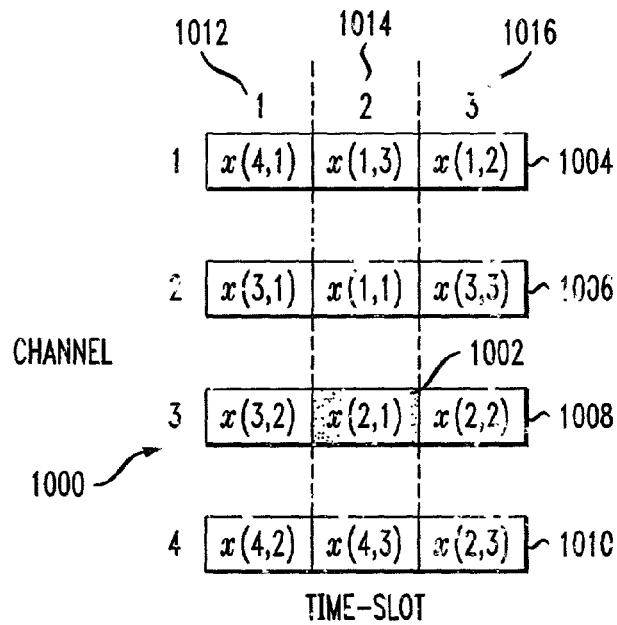
FIG. 10 is a graphical representation illustrating a source-to-destination channel/time-slot map, in accordance with the present invention.

Each byte corresponding to a given channel and time-slot can be transferred to any other channel and time-slot within the cross-connect period. By definition, each channel/time-slot destination receives exactly one byte of data in a cross-connect period. A destination channel and time-slot for each sample can be described using the tuple s(m,n), where m is the particular channel and n is the time-slot. FIG. 10 illustrates a connection map 1000 representing an exemplary 1D source-to-destination routing in which the total number of channels m is 4 (e.g., 1004, 1006, 1008, 1010) and the total number of time-slots n is 3 (e.g., 1012, 1014, 1016). For example, a sample 1002 received on channel 3, time-slot 2 (i.e., s(3,2)) is shown with a destination of channel 2, time-slot 1. This connection map 1000 will be utilized to demonstrate the routing methodologies of the present invention.

By way of example only, consider a 1.28 terabit per second (Tbit/s) cross-connect. In SONET, this would correspond to 24,576 STS-1 channels (each STS-1 channel having a data rate of 51.85 Megabits per second (Mbit/s)) or 32 STS-768 channels (each STS-768 channel having a data rate of 39813.12 Mbit/s). A cross-connect having the necessary data throughput could be achieved with a 256-channel implementation, where each channel has a bandwidth of about 5 Gigabits per second (Gbit/s). This corresponds to a cross-connect period which includes 96 time-slots. Thus, in this example, m=256 and n=96. A more detailed description of SONET may be found, for example, in J. Goralski, "SONET, Second Edition," USA: McGraw-Hill, 2000, which is incorporated herein by reference.

Forming a methodology that allows samples to be stored-and-forwarded through the mesh deterministically and efficiently is an important design challenge. Ideally, memory requirements and worst-case latency for any route through the mesh must be minimal. We would like the worst-case latency or "optimal time" to be 2d−2 for a d×d mesh, where $d^2$ is equal to m, the number of channels in the mesh. Furthermore, we would like to achieve a minimum buffer requirement or "optimal space" of 2×m×n, where, as previously defined, m is the number of channels in the mesh and n is the number of time-slots in a given channel.

Communication through a mesh interconnection network has been studied extensively (see, e.g., D. E. Culler et al., "Parallel Computer Architecture," Morgan Kaufmann Publishers (1999), S. Y. Kung, "VLSI Array Processors," Prentice Hall (1988), and R. K. Ahuja et al., "Network Flows: Theory, Algorithms, and Applications," Prentice-Hall, Englewood Cliffs, N.J. (1993), which are incorporated herein by reference). The general problem is substantially complex. Conventional solutions exist which are able to route samples in optimal time but require at least 31 times the optimal space. Alternatively, limiting communication to permutation routing makes the solution space-optimal but requires at least six times the optimal time. Moreover, most optimal algorithms to date have significant multiplicative constants and are therefore non-trivial to implement.

In accordance with the present invention, the TDM cross-connect problem has useful properties that are advantageously exploited. If there are n sets of samples within a cross-connect period that each have a unique source channel and a unique destination channel, then routing can be formulated, as will be described below, based on a special case of one-to-one routing. It can be demonstrated that a one-to-one routing of samples in a mesh can always be determined, and that using the result as a schedule leads to a simple store-and-forward routing methodology that is substantially space-optimal and time-optimal. In addition, a store-and-forward methodology based on a one-to-one routing can be performed conflict free, as previously explained.

A mathematical derivation of a cross-connect scheduling solution will now be described, in accordance with one aspect of the invention. A vertex set U(u) is preferably defined, where each vertex u in set U corresponds to a particular source channel. Similarly, a vertex set V(v) is defined, where each vertex v in set V corresponds to a particular destination channel. An edge set E(e) may be defined, where each edge e in set E is incident to one vertex u in set U and one vertex v in set V when a sample s is required to be transferred from a source channel u to a destination channel v. It is to be appreciated that a vertex u in set U may be considered a source node while a vertex v in set V may be considered a destination node.

For the above vertex set definitions, the number of vertices in sets U and V correspond to the number of channels in the cross-connect, such that |U|=|V|=m. For the above edge set definition, the number of edges in set E is equal to the total number of samples during one cross-connect period, such that |E|=m×n. A graph G(U, V, E) is preferably defined which includes the vertices u, v and edges e in sets U, V and E, respectively. By definition, the graph G is a k-regular bipartite graph, where k in this instance is equal to the number of time-slots n (see, e.g., D. B. West et al., "Introduction to Graph Theory," NJ: Prentice Hall, 1996, which is incorporated herein by reference).

Figure 11:
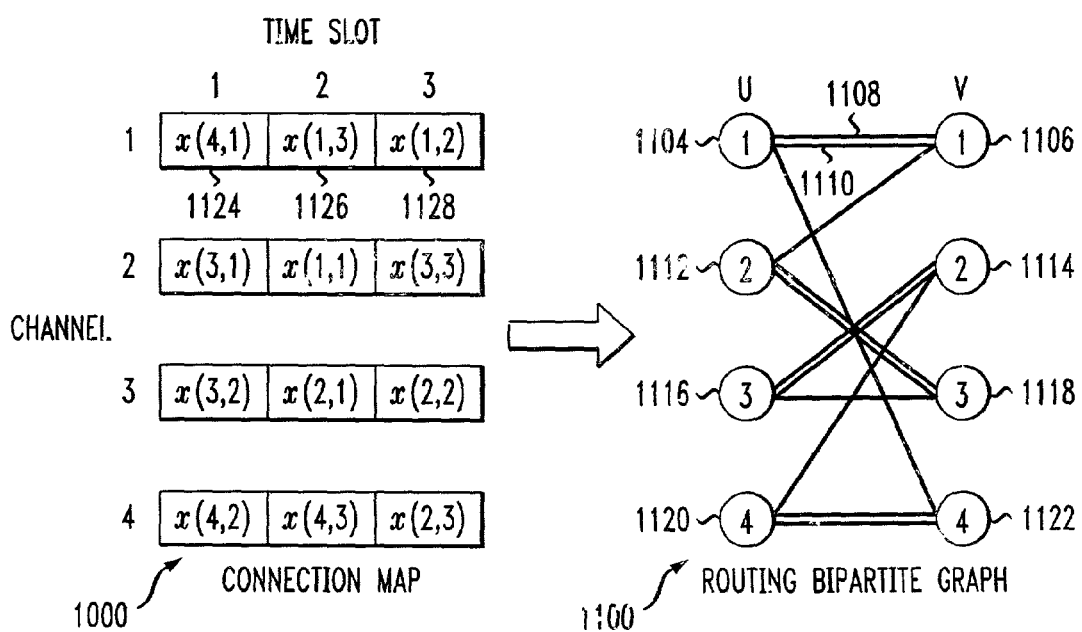
FIG. 11 is a graphical representation illustrating a correspondence between the source-to-destination channel/time-slot map depicted in FIG. 10 and a bipartite graph representation of the corresponding routing, in accordance with the present invention.

FIG. 11 illustrates a routing bipartite graph representation 1100 for the exemplary connection map 1000 shown in FIG. 10. As apparent from the figure, for example, samples 1124, 1126, 1128 received on channel 1 correspond to source vertex 1104 (e.g., u=1) in the bipartite graph 1100. The destination vertices 1106, 1114, 1118, 1122 corresponding to a particular source vertex 1104, 1112, 1116, 1120 will be determined in accordance with the connection map 1000 for the given routing. For example, sample 1124 received on channel 1, time-slot 1 in connection map 1000 indicates a destination of channel 4, time-slot 1. Similarly, sample 1126 has a destination of channel 1, time-slot 3 and sample 1128 has a destination of channel 1, time-slot 2. The same representations are used for the remaining channels 2, 3, 4 in the connection map 1000. Note, that in some instances there may be more than one edge between two vertices. For example, the bipartite graph 1100 indicates two edges 1108, 1110 between source vertex 1104 and destination vertex 1106, each edge 1108, 1110 corresponding to different time-slots in the source and destination vertices 1104, 1106, respectively.

A matching M is preferably defined as a set of edges in set E such that no two edges in mapping set M are adjacent to the same vertex. If |M|=|U|=|V|, then the matching will be maximal. A well-known mathematic theorem, namely, Hall's Matching Theorem described, for example in the text M. Hall, "An Algorithm for Distinct Representation," *Journal of Mathematical Sciences*, pp. 26–30 (1935), proves that a k-regular bipartite graph always has a maximal matching M of size |U|=|V|. If the edges in mapping set M are removed from the routing bipartite graph G, then the resulting graph becomes a (k−1)-regular bipartite graph, which also has a maximal matching of size |U|=|V|. In accordance with the present invention, we can iteratively reduce the routing bipartite graph G to obtain n sets of maximal matches, where again n is the number of time-slots.

This recursive process is consistent with finding a minimum coloring in a bipartite graph. As will be understood by those skilled in the art, a minimum coloring is essentially an assignment of colors to the edges of a bipartite graph G such that no two edges incident with a vertex have the same color and the number of colors used is minimal. As set forth in Hall's Matching Theorem, the minimum number of colors that can be assigned in a k-regular bipartite graph is k. Various polynomial time complexity algorithms have been reported for finding maximal matching and minimum colorings in bipartite graphs, for example in the articles J. Hopcroft et al., "An $n^{5/2}$ Algorithm for Maximum Matchings in Bipartite Graphs," *SIAM Journal of Computing*, Vol. 2, No. 4 (December 1973), H. N. Gabow et al., "Algorithms for Edge Coloring Bipartite Graphs and Multigraphs," *SIAM Journal of Computing*, Vol. 11, No. 1 (February 1982), A. Schrijver, "Bipartite Edge Coloring in O($\Delta$m) Time," *SIAM Journal of Computing*, Vol. 28, No. 3, pp. 841–846 (December 1973), and J. Carpinelli et al., "Applications of Edge-Coloring Algorithms to Routing on Parallel Computers," *Proceedings of the Third International Conference on Supercomputing*, Boston, Mass., pp. 249–257 (May 1988), which are incorporated herein by reference.

Preferably, n sets of samples are determined with each set including m samples, where n is the number of time-slots and m is the number of channels, as previously stated. Each of the m samples originate from one source channel and are associated with a unique destination channel. This is essentially equivalent to finding n maximal matchings that have n disjoint sets of edges such that no two edges are incident with the same vertex. The source-to-destination channel mappings are used to construct a k-regular bipartite graph. Subsequently, the bipartite graph is utilized to find n maximal matchings. Each set of matchings preferably defines a set of samples that are inputs to the one-to-one routing problem. The samples in each set of matchings may be described using the tuple (u, v), where u and v represent the source vertex and destination vertex, respectively, of a given sample.

Figure 12:
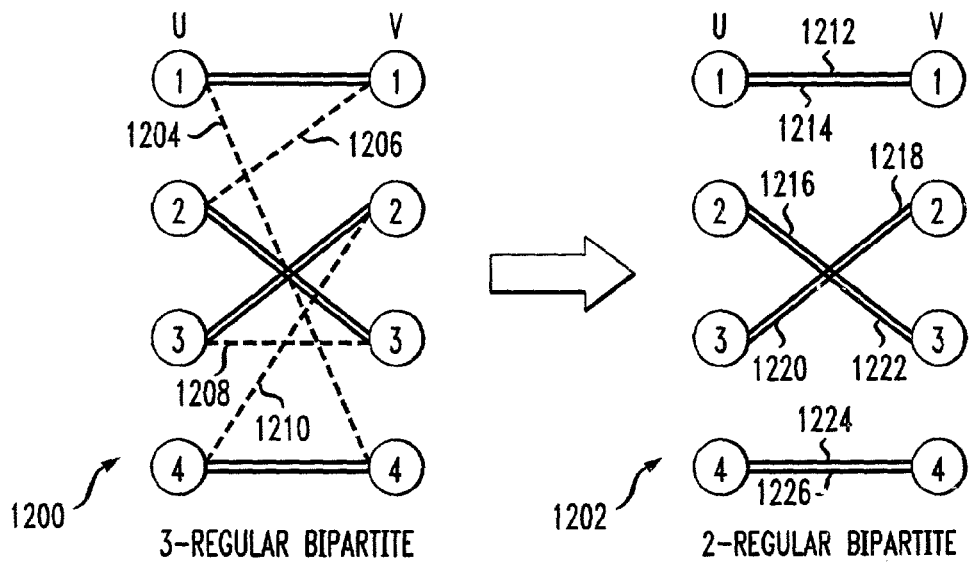
FIG. 12 is a graphical representation illustrating a reduction of the 3-regular bipartite graph depicted in FIG. 11 to a 2-regular bipartite graph, in accordance with the present invention.
Figure 13:
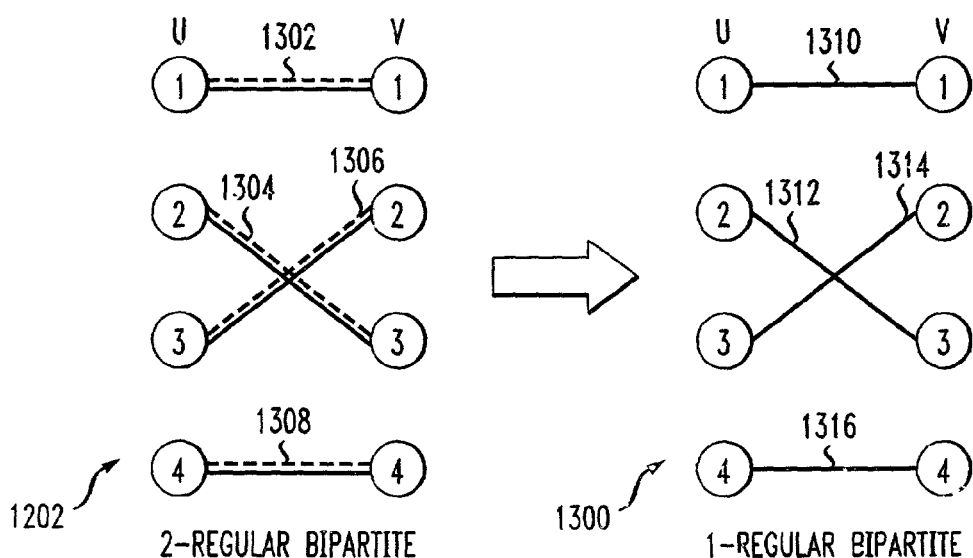
FIG. 13 is a graphical representation illustrating a reduction of the 2-regular bipartite graph depicted in FIG. 12 to a 1-regular bipartite graph, in accordance with the present invention.

By way of example only, FIGS. 12 and 13 illustrate a methodology for determining a maximal matching and reducing the routing bipartite graph shown in FIG. 11, in accordance with the present invention. With reference to FIG. 12, an exemplary 3-regular bipartite graph 1200 is reduced to a 2-regular bipartite graph 1202 by computing a first matching $M_1$ representing all edges 1204, 1206, 1208, 1210 where no two edges in matching $M_1$ are incident with the same vertex. These edges are depicted as dotted lines in the figure and correspond to the matching $M_1$={(1,4), (2,1), (3,3), (4,2)}. As previously stated, in matching $M_1$ each channel is the source and destination of only one sample. When edges 1204, 1206, 1208, 1210 in matching $M_1$ are removed from the bipartite graph 1200, the 2-regular bipartite graph 1202 results. In this reduced graph 1202, one or more of the remaining edges 1212, 1214, 1216, 1218, 1220, 1222, 1224, 1226 share a common source vertex and destination vertex with at least one other edge.

In FIG. 13, the exemplary 2-regular bipartite graph 1202 is reduced to a 1-regular bipartite graph 1300 by computing a second matching $M_2$ representing all edges 1302, 1304, 1306, 1308 where, in a manner consistent with the computation of matching $M_1$, no two edges in matching $M_2$ are incident with the same vertex. These edges are depicted as dotted lines in the figure and correspond to the matching $M_2$={(1,1), (2,3), (3,2), (4,4)}. By removing edges 1302, 1304, 1306, 1308 from bipartite graph 1202, the 1-regular bipartite graph 1300 is determined. The resultant 1-regular bipartite graph 1300 is represented by the final matching $M_3$={(1,1), (2,3), (3,2), (4,4)}. The fact that matching $M_2$ is the same as matching $M_3$ in this example is merely coincidental. In this manner, the three sets of matchings, namely, $M_1$, $M_2$, $M_3$, each mapping including four samples, provides a desired one-to-one source-to-destination channel mapping. It is to be appreciated that the techniques of the present invention described herein may be easily extended to compute additional mappings for a larger set of samples (e.g., a mesh having more channels and/or time-slots). Likewise, for a smaller set of samples a reduced number of matchings may be sufficient. Once all of the mappings have been determined as described above, each matching is preferably assigned to a unique time-slot. The time-slot that each matching is assigned to is not critical and may in fact be arbitrary.

Figure 14:
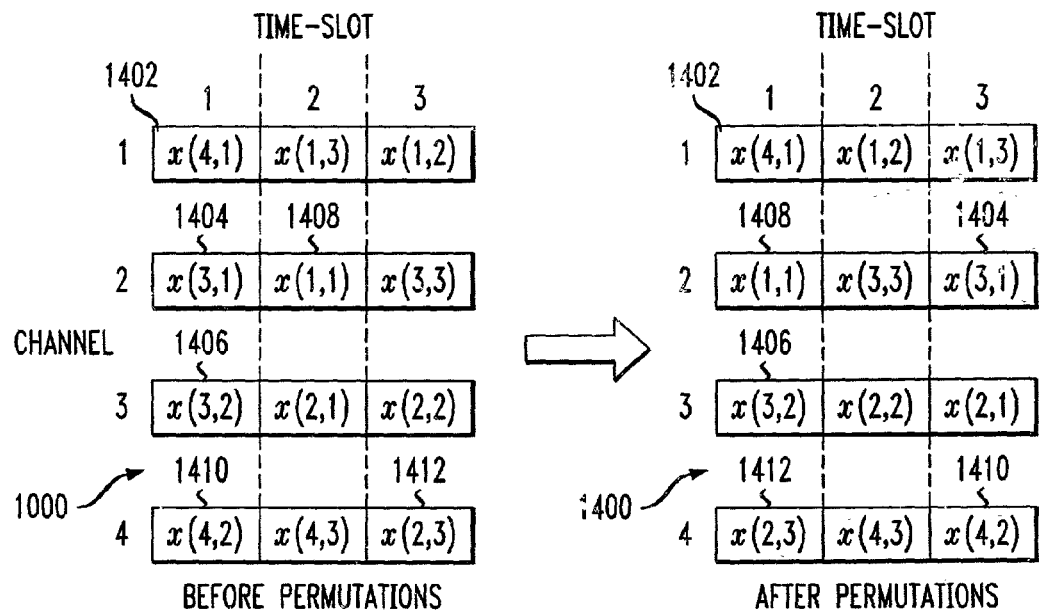
FIG. 14 is a graphical representation illustrating a permutation of the source-to-destination channel/time-slot map of FIG. 10, in accordance with the present invention.

FIG. 14 illustrates how row permutations, which may be required for rearranging the time-slots of one or more samples within each channel, are performed for operatively aligning the matchings $M_1$, $M_2$, $M_3$, as previously computed, within the same time-slots, in accordance with the invention. It is assumed in this illustrative row permutation methodology that matching $M_1$ is assigned to time-slot 1. Recall that $M_1$={(1,4), (2,1), (3,3), (4,2)}. Consequently, each sample that corresponds to this matching must be permuted to time-slot 1. In accordance with matching $M_1$, source channel 1 must be matched to destination channel 4. Since the sample 1402 in time-slot 1 of connection map 1000 is already destined to channel 4, no permutation is required. However, since matching $M_1$ indicates that source channel 2 is matched to destination channel 1 and the sample 1404 presently in time-slot 1 of connection map 1000 is destined to channel 3 rather channel 1, that sample it is permuted (e.g., interchanged) with the sample 1408 in time-slot 2. With respect to channel 3, source channel 3 is matched to destination channel 3 according to matching $M_1$. Since the sample 1406 in time-slot 1 of the connection map 1000 is already destined for channel 3, no action is required. Finally, matching $M_1$ requires source channel 4 to be mapped to destination channel 2. Therefore, since the sample 1410 in time-slot 1 of the connection map 1000 is destined for channel 4 rather than channel 2 as desired, the samples 1410 and 1412 in time-slots 1 and 3, respectively, of channel 4 are permuted.

The above permutation methodology is similarly performed for the next matching $M_2$. By definition, the samples in the final matching $M_3$ will already be properly aligned in their assigned time-slot, resulting in the permuted connection map 1400. For applications involving a larger number of matchings, the techniques of the present invention described herein are preferably recursively performed until only one matching remains. It is to be appreciated that, in accordance with the present invention, when permutations within each of the channels are completed, each time-slot will include samples having unique source and destination channels.

Each time-slot in the illustrative permuted connection map 1400 of FIG. 14 is considered a matching that is treated as a separate routing problem. The input TSI can reorder samples so that all samples that are matched are inserted into the same time-slot. The output TSI is preferably responsible for making sure samples are transmitted during the correct output time-slot. Thus, in accordance with the present invention, the problem of routing samples in the cross-connect has been reduced to one-to-one routing within each time-slot.

Conflict-Free Routing in a 1D Mesh

Now that techniques have been described for reducing a 2D mesh routing to a one-to-one routing problem, additional graph theoretic analyses may be performed to further reduce the routing complexity, in accordance with another aspect of the invention. First, we examine how to perform one-to-one permutation routing on a 1D array of elements with half-duplex links. Routing on a 1D array can be formulated as a parallel sorting problem. Each node in the 1D array is preferably ordered from 1 to m, where m is an integer greater than 1. Since exactly one sample is the source and destination of each node, the destination channel address is preferably appended to each sample, and store-and-forward routing is subsequently performed through the array. The store-and-forward routing may be viewed as performing a parallel sort on these destination channel addresses. Thus, the architecture described herein is effectively a 1D systolic array.

Since each node in the mesh array can transfer one sample in each direction (except for the nodes on either ends of the 1D array), each node can transmit and receive two samples each cycle. Samples traveling in opposite directions can never interfere with one another so there is never a contention issue. Each sample moves one step closer to its predetermined destination node every cycle. The routing requires at most m−1 cycles to complete on an array of n nodes.

Figure 15:
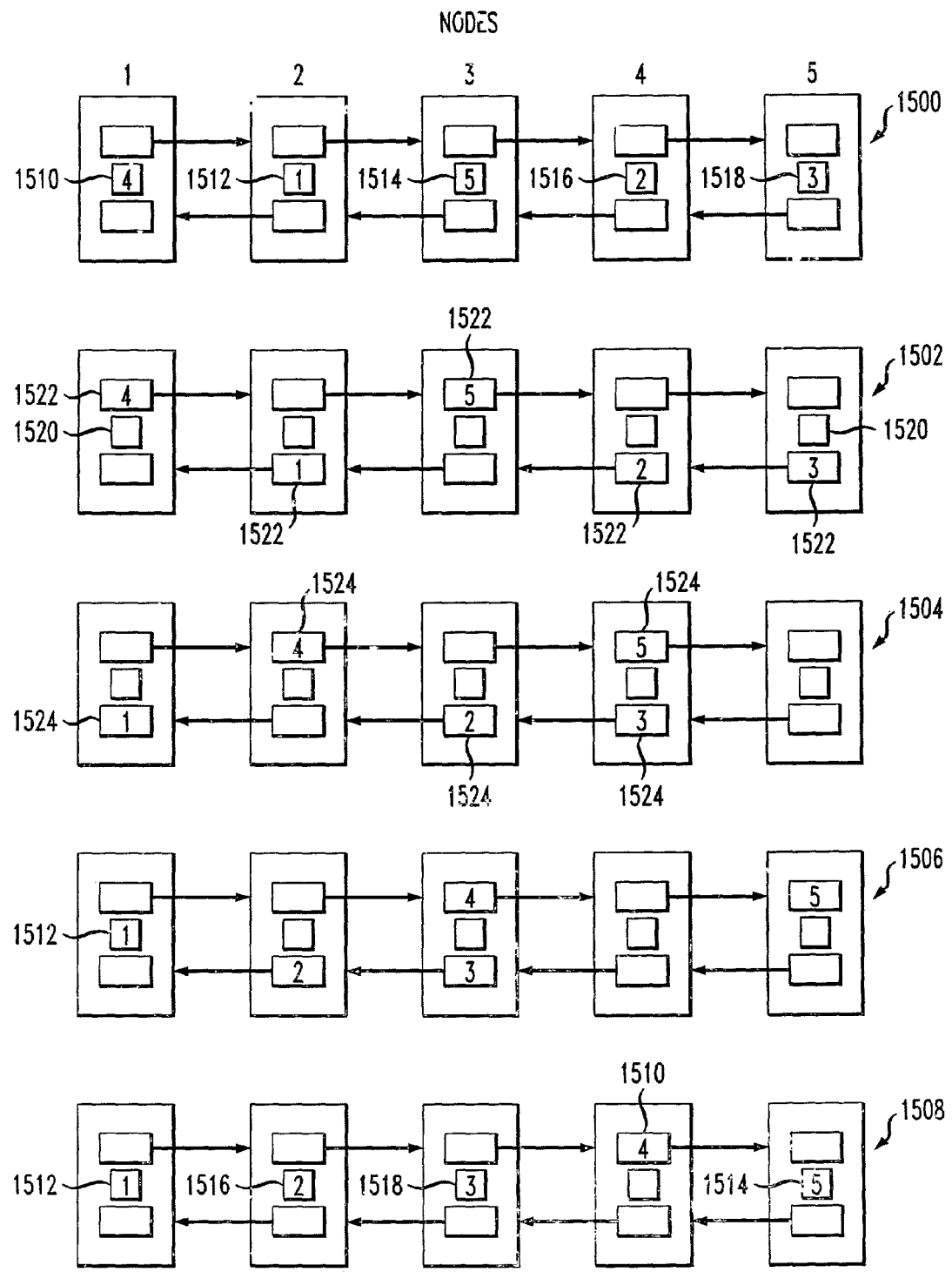
FIG. 15 is a graphical representation illustrating an exemplary store-and-forward routing on a one-dimensional mesh including five nodes, in accordance with the present invention.

By way of example only, FIG. 15 illustrates a routing technique on an exemplary 1D mesh which includes five nodes (e.g., 1 through 5), in accordance with the present invention. With reference to FIG. 15, several sequential representations 1500, 1502, 1504, 1506, 1508 are shown, each of the representations illustrating a particular stage in the process for routing samples through the exemplary 1D mesh. In an initial configuration 1500, the sample 1510 in node 1 is destined to node 4, the sample 1512 in node 2 is destined to node 1, the sample 1514 in node 3 is destined to node 5, the sample 1516 in node 4 is destined to node 2, and the sample 1518 in node 5 is destined to node 3. The destination information for routing each of the samples maybe precomputed off-line using the methodologies of the invention as previously described (e.g., a connection map).

As apparent from the figure, samples 1510, 1514 being routed from a lower number node to a higher number node travel left to right. Similarly, samples 1512, 1516, 1518 being routed from a higher number node to a lower number node travel from right to left. The above destination directions are, of course, arbitrarily chosen and it is to be appreciated that the invention will function similarly if such designations were reversed. During each clock cycle, every sample is examined by a corresponding node receiving such sample and the sample is stored if that node matches the intended destination of the sample. If the node is not the intended destination node of the sample being evaluated, the sample is forwarded to an adjacent node. For example, representation 1502 illustrates how the samples are moved from respective storage buffers 1520 to buffers 1522 included in each node for forwarding the samples to an adjacent node. In representation 1504, all samples have been forwarded to respective buffers 1524 in adjacent nodes to once again be evaluated to determine if the particular node matches an intended destination node of the sample. As shown in representation 1506, the received sample 1512 in node 1 matches its destination node and is therefore stored in node 1. All other samples have been forwarded. Representation 1508 illustrates a final routing in which all samples 1510, have been forwarded to their respective destination nodes. Clearly, the routing in this example is conflict-free.

As previously explained, the 1D mesh may be used as a spatial interconnection network of a TST cross-connect. It has already been shown how the cross-connect can be mapped to a one-to-one routing problem by permuting samples in one or more time-slots such that each time-slot is associated with a particular matching set. Each time-slot (e.g., column) is then mapped to a 1D systolic array. For example, after the permutations in FIG. 14 have been completed, each of the three time-slots can be mapped to a 1D array including four nodes. Each 1D array routes samples from source channels to destination channels in a conflict-free manner. All samples reach their destination nodes in at most three clock cycles.

One limitation with the 1D array, however, is the time required to complete channel routing when the number of channels is large. For instance, when the number of channels is greater than the number of time-slots then routing in the 1D array cannot be completed within one cross-connect period. One solution in this case is to collect more than one cross-connect period worth of data and then route multiple periods of data in a parallel. While this satisfies the functionality of the cross-connect, it comes at the expense of potentially significant additional hardware (e.g, roughly, the number of cross-connect periods times the amount of hardware is required). Since a diameter of the 2D mesh, which may be defined as the longest distance a sample is required to travel, is smaller in comparison to the 1D mesh, the techniques of the present invention are preferably employed to determine a routing solution for a 2D mech architecture.

Conflict-Free Routing in a 2D Mesh

The techniques of the present invention described herein may be operatively extended to provide an efficient conflict-free store-and-forward routing method which can be applied to a 2D mesh. As previously stated, the 2D mesh comprises a plurality of nodes preferably arranged in a column and row configuration or array. The conflict-free store-and-forward routing is essentially only possible when routing on the 2D mesh can be reduced to recursively routing on the individual columns and rows of the mesh. A precomputation can be performed off-line for each column that finds a permutation, whereby after performing the permutation there is at most one sample in each row that is destined for any given column. Once again, a bipartite graph representation can be used to capture the source-to-destination mapping within each of the columns.

A mathematical derivation of a cross-connect scheduling solution will now be described, in accordance with another aspect of the invention. In a manner consistent with the 1D routing methodology previously described, a vertex set U(u) is preferably defined, where each vertex u in set U corresponds to a particular source column. Likewise, a vertex set V(v) is defined, where each vertex v in set V corresponds to a particular destination column. An edge set E(e) may be defined, where each edge e in set E is incident with one vertex u in set U and one vertex v in set V when a sample s is required to be transferred from a source column u to a destination column v. For the above vertex set definitions, the number of vertices in sets U and V are expressed as $|U|=|V|=\sqrt{m}$, where m is the number of channels in the cross-connect when a square mesh is utilized. For the edge set definition, the number of edges in set E is equal to the number of channels in the cross-connect, such that $|E|=m$. A graph G(U, V, E) is preferably defined that includes the vertices u, v and edges e in sets U, V, and E, respectively. By definition, the graph G is a k-regular bipartite graph, where k for the 2D mesh routing case is expressed as $k=\sqrt{m}$. The value k represents the maximum number of edges that are incident to any node (i.e., the degree of the node).

We use the column routing bipartite graph G to find k matchings. Each matching is a permutation that can be used to sort the columns whereby after the column permutations are performed there is at most one sample in each row destined for any given column. After the application of the column permutations, each row is transformed to a one-to-one routing problem. We can then perform a 1D sorting of all the rows in parallel so that afterwards, all the samples are in the correct columns. Once all of the samples are in their correct columns, by definition, sorting of the columns becomes a one-to-one routing problem. Finally, we perform a 1D sort of the columns to complete the 2D routing. The entire channel routing procedure requires at most 3d−3 cycles to complete for a d×d mesh, where d can be any positive integer.

Figure 16:
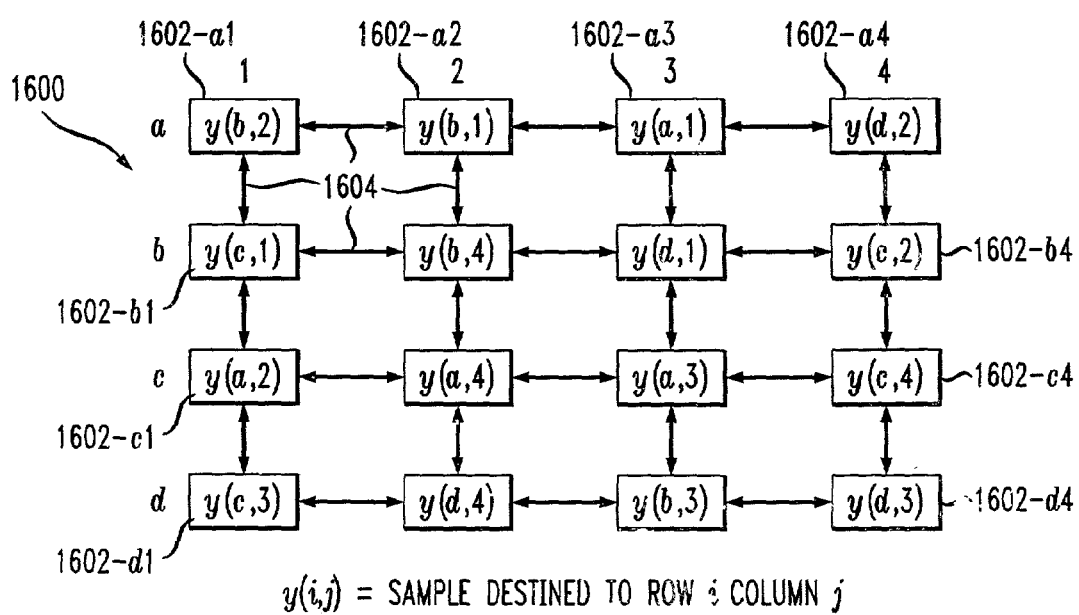
FIG. 16 is a graphical representation of an exemplary 4×4 mesh implementation of a 16-node 2D cross-connect illustrating an instance of a one-to-one routing problem, in accordance with the present invention.

FIG. 16 is an exemplary 4×4 mesh implementation of a 16-node cross-connect illustrating an instance of a one-to-one routing problem, in accordance with the present invention. FIG. 16 is representative of an exemplary routing which may occur during one of the time-slots of the cross-connect after the input TSI computes matching permutations. As apparent from the figure, the nodes 1602-a1 through 1602-d4 are arranged as a 2D mesh 1600 with columns 1 through 4 and rows a through d. Each node in the mesh 1600 is preferably coupled to one or more adjacent nodes via a pair of half-duplex links which are represented in FIG. 16 as bidirectional arrows 1604, consistent with the half-duplex links shown in the mesh of FIG. 6. A particular node in the mesh 1600 may be referenced according to its unique row i and column j by the tuple (i,j). Similarly, each sample y(i, j) associated with a given node is destined to row i and column j. Note, that each node is a source and a destination of one sample. For example, node (a, 1) is a source node of sample y(b, 2) and is a destination node of sample y(a, 1) originating in source node (a, 3).

Figure 17:
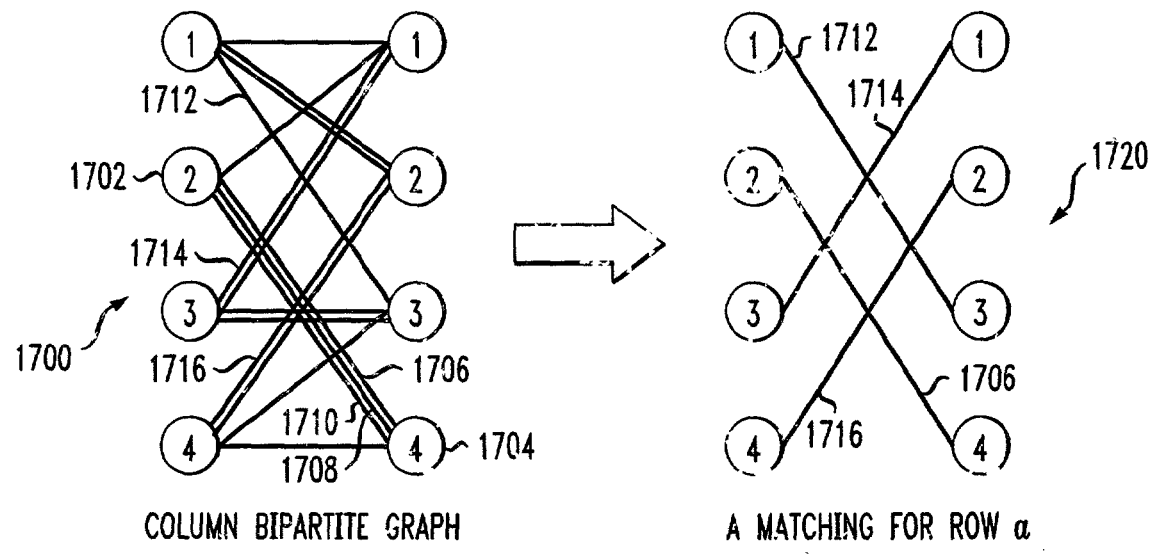
FIG. 17 is a graphical representation illustrating an associated column bipartite graph representation, in accordance with another aspect of the invention.

FIG. 17 illustrates a column routing bipartite graph representation 1700 corresponding to the mesh of FIG. 16, along with a matching that could be used to permute samples into the first row a. The representation 1700 may be considered a 4-regular bipartite graph since there are four columns associated with this illustrative mesh. Note, that in some cases there is more than one edge between two same vertices. For example, vertex 1702 and vertex 1704 have three common edges 1706, 1708, 1710. This situation was similarly addressed above in connection with a one-to-one routing methodology.

In a manner consistent with that used in the one-to-one routing example previously described, the k-regular bipartite graph is preferably reduced to a (k–1)-regular bipartite graph by computing a first matching $M_1$ wherein no two edges in the matching are incident with the same vertices. Matching $M_1$ may then be removed from the bipartite graph to form a reduced bipartite graph. This reduction procedure is iteratively performed, in accordance with the present invention, until a 1-regular bipartite routing graph results. In the 1-regular bipartite graph, only one edge exists between any two vertices. Again, Hall's Matching Theorem can be employed to determine the maximal matchings. The matchings indicate which samples need to be permuted into the same row. As previously explained, it does not matter which row a particular matching is associated with and a matching may, in fact, be arbitrarily selected to correspond to a given row.

FIG. 17 depicts a first matching 1720 which has been selected for row a such that $M_a=\{(1, 3), (2,4), (3, 1), (4, 2)\}$. As apparent from the figure, matching $M_a$ includes edges 1706, 1712, 1714 and 1716. With reference again to FIGS. 16 and 17, in accordance with matching 1720, the sample y(c, 3) in column 1 row d that is destined to column 3 is permuted to row a. Similarly, the sample y(a, 4) in column 2 row c that is destined to column 4 is permuted to row a, and sample y(a, 1) in column 3 row a destined to column 1 is not permuted but instead remains in row a. Finally, sample y(c, 2) in column 4 row b destined to column 2 is permuted to row a. Permutations are performed in a similar manner for the three remaining matchings corresponding to rows b through d. The above permutation process is preformed during a first phase of the 2D routing methodology of the present invention.

Figure 18:
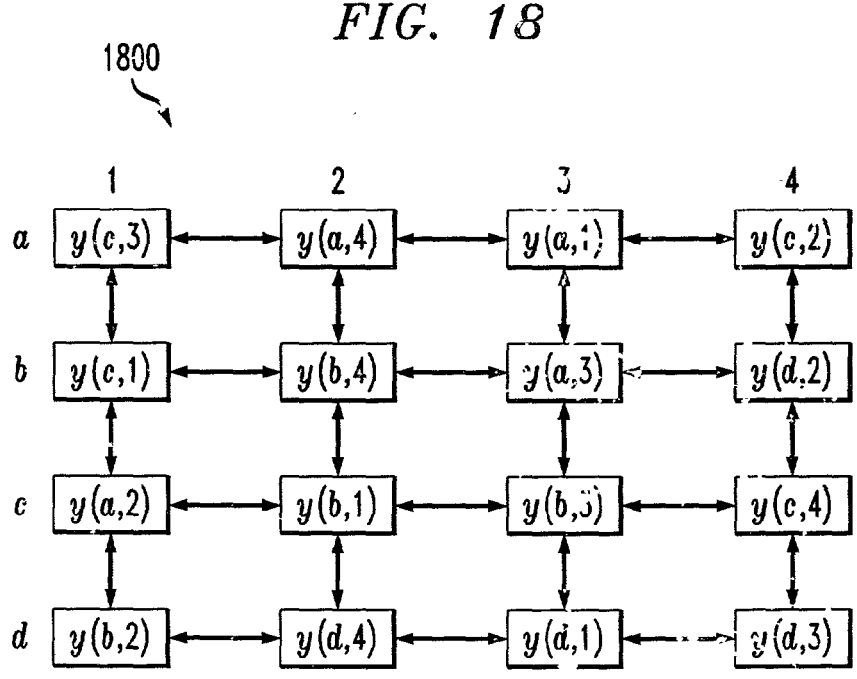
FIG. 18 is a graphical representation of the exemplary mesh of FIG. 16 illustrating an instance of a one-to-one routing problem after column permutations have been performed, in accordance with the present invention.
Figure 19:
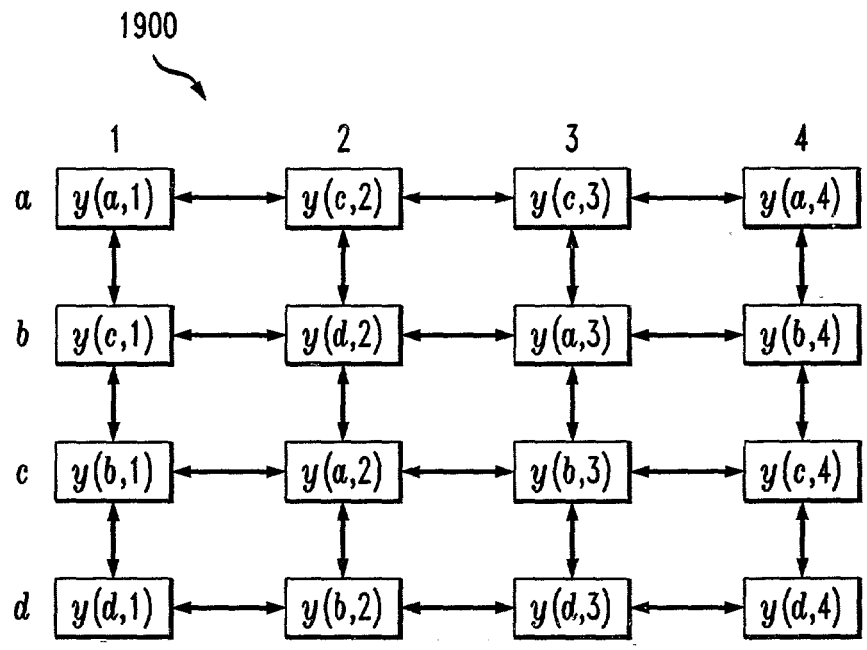
FIG. 19 is a graphical representation of an exemplary mesh of FIG. 16 illustrating an instance of a one-to-one routing problem after row permutations have been performed, in accordance with the present invention.

FIG. 18 illustrates the exemplary 4×4 mesh 1800 after all column permutations have been performed. Note, that after the permutations, there is at most one sample y(i, j) in each row a through d destined for any column 1 through 4 in that row. In a second phase of the 2D routing methodology of the present invention, samples in each of the rows are sorted (e.g., routed in a row direction) such that each sample is destined to its correct column. For example, with respect to row a, sample y(c, 3) in column 1 row a is routed to column 3 row a, sample y(a, 4) in column 2 row a is routed to column 4, etc. Once again, this is a one-to-one routing problem in a 1D array and therefore the techniques of the present invention previously described may be utilized. FIG. 19 depicts the mesh 1900 after row sorting throughout the mesh has been completed, in accordance with the invention.

Figure 20:
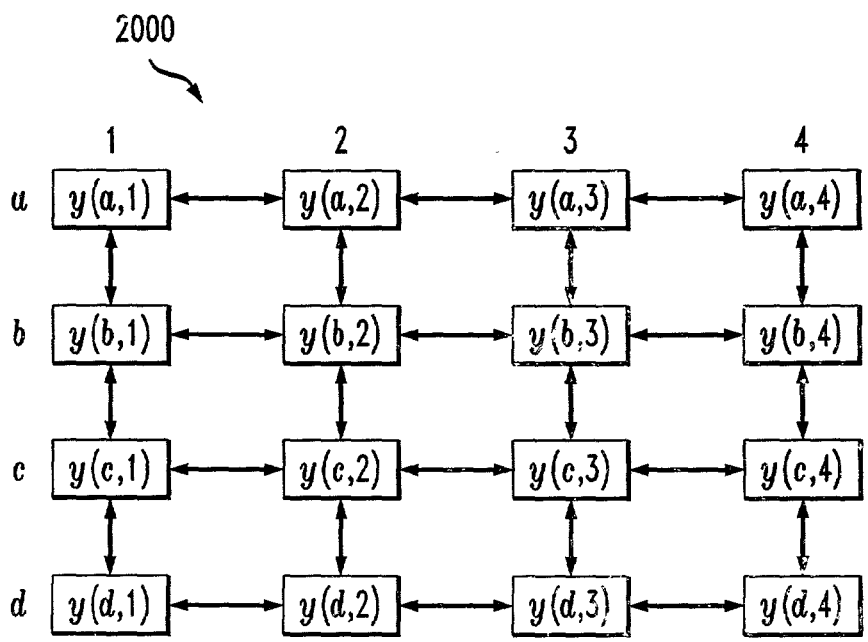
FIG. 20 is a graphical representation of an exemplary 4×4 mesh of FIG. 16 illustrating an instance of a one-to-one routing problem after a second column permutations have been performed, in accordance with the present invention.

In a third and final phase of the 2D routing methodology of the present invention, samples in each of the columns are sorted (e.g., routed in a column direction) whereby all samples reach their final destination nodes. For example, with respect to column 1, sample y(a, 1) in column 1 row a remains in its present node, sample y(c, 1) in column 1 row b is routed to column 1 row c, etc. FIG. 20 depicts the mesh 2000 after the final column sorting throughout the illustrative mesh has been completed. As apparent from the figure, all samples have reached their intended destination nodes. Subsequently, the output TSIs permute corresponding samples in each node so that the data is sent during the correct time-slot.

In accordance with one aspect of the present invention, off-line matching computations are used to determine one-to-one channel routing in a 2D mesh by performing three iterations of 1D sort-based routing. In a first iteration, the columns are sorted based on the permutations determined from the matchings, as described above. In a second iteration, each of the rows in the mesh are sorted in accordance with a predefined sorting technique as will be understood by those skilled in the art. Finally, in a third iteration, each of the columns in the mesh are sorted. It is to be appreciated that the same results are achieved if the matching permutations are applied to the rows rather than to the columns as previously described. In this case, 1D sorting is first performed on the rows, then on the columns, and finally on the rows. Furthermore, although the exemplary 2D mesh was a d×d (i.e., square) mesh, the present invention similarly contemplates that the 2D mesh can also be rectangular (e.g., an m×n mesh, where m is not equal to n). In this case, d would represent the maximum number of nodes in either the row or the column direction.

Given the functionality described herein, operation of the mesh-based cross-connect preferably occurs in three distinct phases, as previously described. During a first phase, samples read from each receive channel are permuted with the input TSIs in each of the corresponding channels such that each time-slot has samples that satisfy requirements for one-to-one routing. The permutations are based on the first off-line matching calculations that are captured in the connection memory. During a second phase, channel routing is performed using the column (or row) permutations that were computed off-line and stored in the connection memory. During a third phase, the output TSIs permute corresponding samples such that they are transmitted during an appropriate time-slot. These three phases are preferably pipelined and may be performed concurrently, whereby samples are processed at a throughput which is three times faster, as compared to if the three phases were not performed concurrently, during any given cross-connect period.

The cross-connect architecture of the present invention has several inherent advantageous features which make it particularly well-suited for implementation in a VLSI semiconductor device due, at least in part, to the incorporation of the mesh topology described herein. Such advantages include, but are not limited to, simplicity, modularity and regularity. Furthermore, the architecture of the invention requires only local communication, which may substantially reduce the required interconnect and/or pin count in the semiconductor device. The mesh architecture of the present invention makes it an ideal solution for area-based flip-chip technologies. Package substrate connections can be placed vertically above on-chip I/O drivers for substantially zero signal skew and IR drop.

A preferred implementation of the present invention may employ a single channel as a primary functional block that can be replicated in two or more dimensions in order to obtain a desired bandwidth. This can be achieved, for example, with a configurable channel controller (not shown) operatively coupled to each of the channels. The channel controller may be used to selectively configure each single channel as an interior node or as a periphery node (i.e., a node on the periphery of the mesh), as understood by those skilled in the art. Configuration registers operatively coupled to the configuration controller may be used to selectively define a given channel as an interior node or as a periphery node. When the channel is configured as an interior node, it can be programmed to utilize all four half-duplex links. Likewise, when the channel is configured as a periphery node, it can be programmed to selectively disable one or more half-duplex links that are not being used.

A conventional methodology can be used for updating the connection memory, as known by those skilled in the art. In addition to the n-byte wide half-duplex links used for channel routing, an additional link may be included for concurrent updating of alternate sets of connection memory while channel routing is being performed. A simple conventional protocol, such as, for example, a west-first then south-last store-and-forward protocol, may be used to update the connection memory in m×n clock cycles for an m×n mesh.

For certain applications, such as, but not limited to, rapid network recovery, it may be necessary to complete off-line computations within certain predetermined specifications. One way to address this issue is by including a dedicated graph-matching engine (not shown). Since the off-line calculations are generally limited to a few 8-bit algorithmic logic unit (ALU) operations per iteration for a simple matching algorithm (e.g., an augmenting path approach, as understood by those skilled in the art), a VLSI implementation of such graph-matching engine would be reasonable.

Multiple-Chip 3D Mesh Architecture

There are at least two primary limitations to building multi-Gbit/s single-chip cross-connects, namely, maximum power dissipation using present packing technology and maximum pin count (i.e., largest number of I/O pins available in the package). Accordingly, a technique for extending the 2D mesh architecture to a 3D mesh using multiple chips will be described, in accordance with another aspect of the invention.

Figure 21:
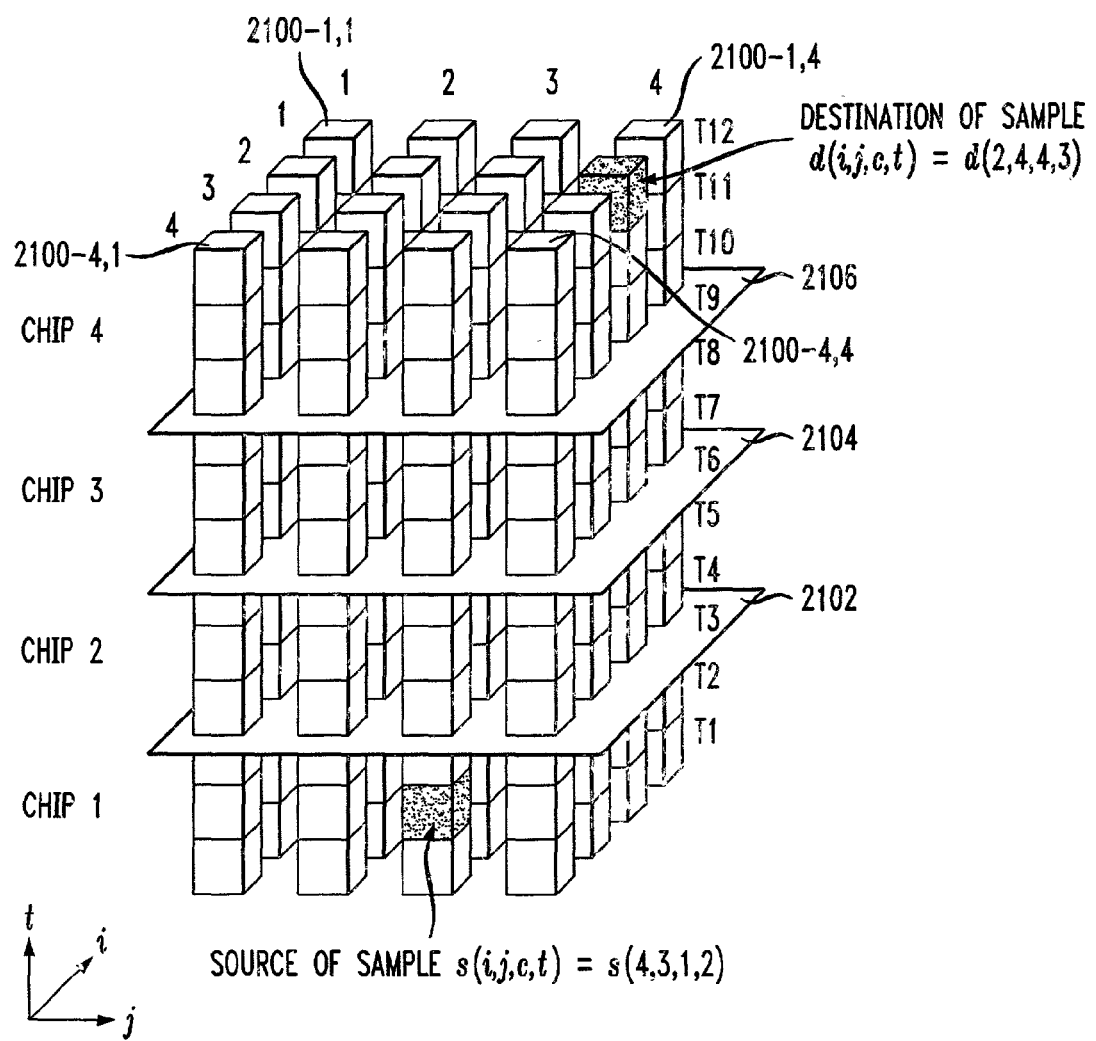
FIG. 21 is a graphical representation depicting a three-dimensional model of an exemplary multi-chip implementation of the 4×4 mesh of FIG. 7 including an expanded number of time-slots, in accordance with another aspect of the present invention.

In FIG. 7, a 2D mesh architecture was illustrated using a 3D representation model including time-slots as a third dimension. One approach that can be used to increase cross-connect bandwidth is to employ multiple chips to increase the number of time-slots per period. FIG. 21 illustrates an exemplary cross-connect implementation for extending the number of time-slots in the example in FIGS. 7 to 12 time-slots using four chips (e.g., chip 1 through chip 4), in accordance with the present invention. In the illustrative cross-connect, each chip includes three time-slots and a same number of channels or nodes 2100-1,1 through 2100-4,4. For each sample, the coordinates (i,j) preferably specify a particular channel address, coordinate c preferably specifies a particular chip, and coordinate t preferably specifies a time-slot within a given chip. Each sample is routed from a source channel, chip, and time-slot s(i, j, c, t) to a destination channel, chip, and time-slot d(i,j, c, t).

Although the hyperplanes illustrated in FIG. 21 partition the time-slots into segments, the set of time-slots associated with each channel are functionally equivalent to the single chip case and the techniques for permuting samples in channels to formulate routing between channels as one-to-one routing still holds. One difference with the multiple-chip architecture is that the permutations of samples within a channel may require the sample to be transferred to a time-slot in another chip. Since the TSI memory is distributed across different chips, an additional mechanism is required.

The time-slot segments are viewed as nodes in a 1D linear array. Samples that arrive on one chip that are required to be permuted to another chip are transported using the 1D systolic array architecture described earlier. The multi-chip architecture is a 3D mesh with samples systolically transported iteratively in each dimension. In order to support chip-to-chip transfer of samples within channels, up to two additional sets of receiver (Rx) and transmitter (Tx) I/O interfaces may be required. Specifically, where a given chip in the multiple-chip architecture is adjacent to two other chips, a first set of Rx and Tx I/O interfaces is required for the transfer of samples to one adjacent chip and a second set of Rx and Tx interfaces is required for the transfer of samples to the other adjacent chip.

Although illustrative embodiments of the present invention have been described herein with reference to the accompanying drawings, it is to be understood that the invention is not limited to those precise embodiments, and that various other changes and modifications may be made therein by one skilled in the art without departing from the scope or spirit of the invention.

What is claimed is:

1. A synchronous cross-connect switch, comprising:
    a mesh architecture including a plurality of inputs for receiving one or more data samples presented to the cross-connect switch, the mesh architecture comprising a plurality of nodes operatively interconnected with one another using one or more half-duplex links, each of the nodes comprising:
    a receiver for receiving at least one data sample presented to the node;
    a transmitter for transmitting at least one data sample from the node;
    an input time-slot-interchanger (TSI) operatively coupled to at least a first half-duplex link and to the receiver, the input TSI being configurable to selectively reorder one or more data samples received by the receiver;
    an output TSI operatively coupled to at least a second half-duplex link and to the transmitter, the output TSI being configurable to selectively reorder one or more data samples to be transmitted by the transmitter; and
    a controller operatively coupled to the receiver and transmitter, the controller being configured to selectively route a data sample to at least one of: (i) an output of the cross-connect switch; and (ii) an adjacent node in the mesh architecture;
    wherein the controller comprises at least one processor operative to: (i) precompute one or more routing sequences, the routing sequences reducing a routing in the mesh architecture to a one-to-one routing within each of one or more time-slots associated with the node; (ii) reorder the one or more data samples within one or more source nodes in accordance with the precomputed routing sequences; (iii) route the one or more data samples from the one or more source nodes to one or more corresponding destination nodes through the mesh; (iv) reorder the one or more data samples within the destination nodes, whereby the data samples are transmitted during a correct time-slot; and (v) partition the one or more time-slots associated with the nodes into a plurality of segments, each of the segments including a same number of nodes, each of the nodes including a subset of the one or more time-slots such that the one or more time-slots are distributed across the plurality of segments; wherein the reordering of the data samples within one or more source nodes, the routing of the data samples from one or more source nodes to one or more destination nodes, and the reordering of the data samples within the destination nodes are performed substantially in parallel within each of the plurality of segments.

2. The cross-connect switch of claim 1, wherein the controller is configured to selectively route the one or more data samples in a conflict-free manner.

3. The cross-connect switch of claim 1, wherein at least one of the nodes further comprises a routing buffer operatively coupled to the input TSI and the output TSI, the routing buffer being configured to at least temporarily store at least one data sample during a reordering of the one or more data samples.

4. The cross-connect switch of claim 1, wherein at least one of the nodes further comprises a connection map operatively coupled to the controller, the controller selectively routing one or more data samples in the node in accordance with information stored in the connection map.

5. The cross-connect switch of claim 1, wherein at least one of the receiver and the transmitter comprises a serializer/deserializer (SERDES).

6. The cross-connect switch of claim 1, wherein the receiver and the transmitter each include an input/output (I/O) interface for operatively transferring a data sample between the node and the mesh architecture.

7. The cross-connect switch of claim 1, wherein at least one of the nodes further comprises a transceiver operatively coupled to the controller, wherein the receiver and the transmitter are included in the transceiver.

8. A method of routing one or more data samples through a cross-connect switch, the cross-connect switch including a plurality of nodes operatively coupled in a mesh arrangement, each of the nodes including one or more time-slots associated therewith, the method comprising the steps of:
   precomputing one or more routing sequences, the routing sequences reducing a routing in the mesh to a one-to-one routing within each of the time-slots;
   reordering the data samples within one or more source nodes in accordance with the precomputed routing sequences;
   routing the data samples from the one or more source nodes to one or more corresponding destination nodes through the mesh arrangement; and
   reordering the data samples within the destination nodes, whereby the data samples are transmitted during a correct time-slot;
   wherein the step of routing the data samples from the one or more source nodes to the one or more corresponding destination nodes comprises the steps of:
      routing the data samples in a first dimension in parallel in accordance with the precomputed routing sequences to determine corresponding destination nodes;
      routing the data samples in a second dimension in parallel, whereby the data samples are routed to intended nodes in the first dimension; and
      routing the data samples in the first dimension in parallel whereby each of the data samples are routed to the corresponding destination nodes.

9. The method of claim 8, wherein the step of routing the data samples from the one or more source nodes to the one or more corresponding destination nodes is performed in a conflict-free manner.

10. The method of claim 8, wherein the step of routing the data samples from the one or more source nodes to the one or more corresponding destination nodes is implemented using a store-and-forward routing.

11. The method of claim 10, wherein the store-and-forward routing of the data samples further includes the step of performing systolic sorting of the data samples.

12. The method of claim 8, wherein the step of precomputing one or more routing sequences comprises the step of computing a graph-theoretic model for the routing sequences.

13. A method of routing one or more data samples through a cross-connect switch, the cross-connect switch including a plurality of nodes operatively coupled in a mesh arrangement, each of the nodes including one or more time-slots associated therewith, the method comprising the steps of:
   precomputing one or more routing sequences, the routing sequences reducing a routing in the mesh to a one-to-one routing within each of the time-slots;
   reordering the data samples within one or more source nodes in accordance with the precomputed routing sequences;
   routing the data samples from the one or more source nodes to one or more corresponding destination nodes through the mesh arrangement;
   reordering the data samples within the destination nodes, whereby the data samples are transmitted during a correct time-slot; and
   partitioning the one or more time-slots associated with the plurality of nodes into a plurality of segments, each of the segments including a same number of nodes, each of the nodes including a subset of the one or more time-slots such that the one or more time-slots are distributed across the plurality of segments;
   wherein the steps of reordering the data samples within one or more source nodes, routing the data samples from the one or more source nodes to one or more corresponding destination nodes, and reordering the data samples within the destination nodes are performed substantially in parallel within each of the plurality of segments.

14. An integrated circuit including at least one synchronous cross-connect switch, the at least one synchronous cross-connect switch comprising:
   a mesh architecture including a plurality of inputs for receiving one or more data samples presented to the cross-connect switch, the mesh architecture comprising a plurality of nodes operatively interconnected with one another using one or more half-duplex links, each of the nodes comprising:
      a receiver;
      a transmitter;
      an input time-slot-interchanger (TSI) operatively coupled to at least a first half-duplex link and to the receiver, the input TSI being configurable to selectively reorder one or more data samples received by the receiver;
      an output TSI operatively coupled to at least a second half-duplex link and to the transmitter, the output TSI being configurable to selectively reorder one or more data samples to be transmitted by the transmitter; and
      a controller operatively coupled to the receiver and transmitter, the controller being configured to selectively route a sample to at least one of: (i) an output of the cross-connect switch; (ii) and an adjacent node in the mesh architecture;
      wherein the controller comprises at least one processor operative to: (i) precompute one or more routing sequences, the routing sequences reducing a routing in the mesh architecture to a one-to-one routing within each of one or more time-slots associated with the node; (ii) reorder the one or more data samples within one or more source nodes in accordance with the precomputed routing sequences; (iii) route the one or more data samples from the one or more source nodes to one or more corresponding destination nodes through the mesh; (iv) reorder the one or more data samples within the destination nodes, whereby the data samples are transmitted during a correct time-slot; and (v) partition the one or more time-slots associated with the nodes into a plurality of segments, each of the segments including a same number of nodes, each of the nodes including a subset of the one or more time-slots such that the one or more time-slots are distributed across the plurality of segments; wherein the reordering of the data samples within one or more source nodes, the routing of the data samples from one or more source nodes to one or more destination nodes, and the reordering of the data samples within the destination nodes are performed substantially in parallel within each of the plurality of segments.

15. The integrated circuit of claim 14, wherein the controller is configured to selectively route the one or more data samples in a conflict-free manner.

16. The integrated circuit of claim 14, wherein at least one of the nodes further comprises a routing buffer operatively coupled to the input TSI and to the output TSI, the routing buffer being configured to at least temporarily store a data sample during a reordering of the one or more data samples.

17. The integrated circuit of claim 14, wherein at least one of the nodes further comprises a connection map operatively coupled to the controller, the controller selectively routing one or more data samples in the node in accordance with information stored in the connection map.

18. The integrated circuit of claim 14, wherein at least one of the receiver and the transmitter comprises a serializer/deserializer (SERDES).

19. The integrated circuit of claim 14, wherein at least one of the nodes further comprises a transceiver operatively coupled to the controller, wherein the receiver and the transmitter are included in the transceiver.

20. A synchronous cross-connect switch, comprising:
a distributed mesh architecture including a plurality of inputs for receiving one or more data samples presented to the cross-connect switch, the distributed mesh architecture comprising a plurality of segments, each of the segments including a plurality of nodes associated therewith, the nodes in each of the segments being operatively interconnected with one another using one or more half-duplex links, each of the nodes comprising:
a plurality of receivers, at least one of the plurality of receivers being configured to receive a data sample presented to the node;
a plurality of transmitters, at least one of the plurality of transmitters being configured to transmit a data sample from the node;
an input time-slot-interchanger (TSI) operatively coupled to at least a first half-duplex link and to the receiver, the input TSI being configurable to selectively reorder one or more data samples received by the at least one receiver;
an output TSI operatively coupled to at least a second half-duplex link and to the transmitter, the output TSI being configurable to selectively reorder one or more data samples to be transmitted by the at least one transmitter; and
a controller operatively coupled to the plurality of receivers and to the plurality of transmitters, the controller being configured to selectively route a data sample to at least one of: (i) an output of the cross-connect switch; (ii) an adjacent node in a same segment in the mesh architecture; and (iii) an adjacent node in an adjacent segment in the mesh architecture;
wherein the controller comprises at least one processor operative to: precompute one or more routing sequences, the routing sequences reducing a routing in the distributed mesh architecture to a one-to-one routing within each of one or more time-slots associated with the node; reorder the one or more data samples within one or more source nodes in accordance with the precomputed routing sequences; route the one or more data samples from the one or more source nodes to one or more corresponding destination nodes through the mesh; route the data samples in a first dimension in parallel in accordance with the precomputed routing sequences to determine the corresponding destination nodes; route the data samples in a second dimension in parallel whereby the data samples are routed to intended nodes in the first dimension; route the data samples in the first dimension in parallel whereby each of the data samples are routed to the corresponding destination nodes; and reorder the one or more data samples within the destination nodes whereby the data samples are transmitted during a correct time-slot.

21. The cross-connect switch of claim 20, wherein at least one of the plurality of nodes further comprises a connection map operatively coupled to the controller, the controller selectively routing one or more data samples in the node in accordance with information stored in the connection map.

22. The cross-connect switch of claim 20, wherein at least one of the plurality of nodes further comprises a routing buffer operatively coupled to the input TSI and the output TSI, the routing buffer being configured to at least temporarily store at least one data sample during a reordering of the one or more data samples.

23. A synchronous cross-connect switch, comprising:
a mesh architecture including a plurality of inputs for receiving one or more data samples presented to the cross-connect switch, the mesh architecture comprising a plurality of nodes operatively interconnected with one another using one or more half-duplex links, each of the nodes comprising:
a receiver for receiving at least one data sample presented to the node;
a transmitter for transmitting at least one data sample from the node;
an input time-slot-interchanger (TSI) operatively coupled to at least a first half-duplex link and to the receiver, the input TSI being configurable to selectively reorder one or more data samples received by the receiver;
an output TSI operatively coupled to at least a second half-duplex link and to the transmitter, the output TSI being configurable to selectively reorder one or more data samples to be transmitted by the transmitter; and
a controller operatively coupled to the receiver and transmitter, the controller comprising at least one processor operative to: precompute one or more routing sequences, the routing sequences reducing a routing in the mesh architecture to a one-to-one routing within each of one or more time-slots associated with the node; reorder the one or more data samples within one or more source nodes in accordance with the precomputed routing sequences; route the one or more data samples from the one or more source nodes to one or more corresponding destination nodes through the mesh by routing the data samples in a first dimension in parallel in accordance with the precomputed routing sequences to determine the corresponding destination nodes, routing the data samples in a second dimension in parallel whereby the data samples are routed to intended nodes in the first dimension, and routing the data samples in the first dimension in parallel whereby each of the data samples are routed to the corresponding destination nodes; and reorder the one or more data samples within the destination nodes whereby the data samples are transmitted during a correct time-slot.

* * * * *